(12) United States Patent
Chuba et al.

(10) Patent No.: US 9,266,300 B2
(45) Date of Patent: Feb. 23, 2016

(54) AIR CUSHION INFLATION MACHINE

(75) Inventors: Larry Chuba, Akron, OH (US); Lawrence Valenti, Broadview Heights, OH (US); David Romo, Mentor, OH (US); Michael Riccardi, Chesterland, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 254 days.

(21) Appl. No.: 13/543,082

(22) Filed: Jul. 6, 2012

(65) Prior Publication Data

US 2013/0011510 A1    Jan. 10, 2013

Related U.S. Application Data

(60) Provisional application No. 61/505,261, filed on Jul. 7, 2011.

(51) Int. Cl.
*B65B 31/02* (2006.01)
*B31D 5/00* (2006.01)

(52) U.S. Cl.
CPC ...... *B31D 5/0073* (2013.01); *B31D 2205/0047* (2013.01); *B31D 2205/0082* (2013.01)

(58) Field of Classification Search
USPC ............ 425/370–371; 53/403, 550, 562, 568; 156/361, 495–498
See application file for complete search history.

(56) References Cited

U.S. PATENT DOCUMENTS

| | | |
|---|---|---|
| 2,153,214 A | 4/1939 | Tondrean |
| 3,033,257 A | 5/1962 | Weber |
| 3,254,820 A | 6/1966 | Lerner |
| 3,254,828 A | 6/1966 | Lerner |
| 3,298,156 A | 1/1967 | Lerner |
| 3,358,823 A | 12/1967 | Paxton |
| 3,359,703 A | 12/1967 | Quaadgras |
| 3,389,534 A | 6/1968 | Pendleton |
| 3,414,140 A | 12/1968 | Feldkamp |

(Continued)

FOREIGN PATENT DOCUMENTS

| | | |
|---|---|---|
| CA | 2428246 | 9/2002 |
| EP | 1466720 | 10/2004 |

(Continued)

OTHER PUBLICATIONS

International Search Report and Written Opinion from PCT/US05/18817 dated Mar. 30, 2007.

(Continued)

*Primary Examiner* — Joseph S Del Sole
*Assistant Examiner* — Thukhanh T Nguyen
(74) *Attorney, Agent, or Firm* — Calfee, Halter & Griswold LLP

(57) ABSTRACT

A machine for converting a web of preformed pouches into inflated dunnage units. The pouches are defined by transverse seals extending from a remote edge to within a predetermined distance from an inflation edge. The machine includes a tensioning device for frictional engagement with the web, an inflation arrangement for inflation of the preformed pouches, a sealing arrangement, and a clamping arrangement. The sealing arrangement may be positioned to provide a longitudinal seal that intersects the transverse seals to close the preformed pouches and form a dunnage unit. The tensioning device holds the web taught during downstream travel.

27 Claims, 33 Drawing Sheets

(56) References Cited

U.S. PATENT DOCUMENTS

| | | |
|---|---|---|
| 3,462,027 A | 8/1969 | Puckhaber |
| 3,477,196 A | 11/1969 | Lerner |
| 3,523,055 A | 8/1970 | Lemelson |
| 3,575,757 A | 4/1971 | Smith |
| 3,575,781 A | 4/1971 | Pezely |
| 3,577,305 A | 5/1971 | Hines et al. |
| 3,616,155 A | 10/1971 | Chavannes |
| 3,618,286 A | 11/1971 | Membrino |
| 3,650,877 A | 3/1972 | Johnson |
| 3,660,189 A | 5/1972 | Troy |
| 3,667,593 A | 6/1972 | Pendleton |
| 3,730,240 A | 5/1973 | Presnick |
| 3,744,211 A | 7/1973 | Titchenal et al. |
| 3,791,573 A | 2/1974 | Titchenal et al. |
| 3,795,163 A | 3/1974 | Armstrong et al. |
| 3,802,974 A | 4/1974 | Emmel |
| 3,808,981 A | 5/1974 | Shaw |
| 3,813,845 A | 6/1974 | Weikert |
| 3,817,803 A | 6/1974 | Horsley |
| 3,837,990 A | 9/1974 | McConnell et al. |
| 3,837,991 A | 9/1974 | Evans et al. |
| 3,855,037 A | 12/1974 | Imhagen et al. |
| 3,938,298 A | 2/1976 | Luhman et al. |
| 3,939,995 A | 2/1976 | Baxter |
| 3,941,306 A | 3/1976 | Weikert |
| 4,014,154 A | 3/1977 | Lerner |
| 4,017,351 A | 4/1977 | Larson |
| 4,021,283 A | 5/1977 | Weikert |
| 4,040,526 A | 8/1977 | Baxter et al. |
| 4,044,693 A | 8/1977 | Ramsey, Jr. |
| 4,076,872 A | 2/1978 | Lewicki et al. |
| 4,096,306 A | 6/1978 | Larson |
| 4,102,364 A | 7/1978 | Leslie et al. |
| 4,103,471 A | 8/1978 | Lowdermilk |
| 4,146,069 A | 3/1979 | Angarola et al. |
| 4,169,002 A | 9/1979 | Larson |
| 4,201,029 A | 5/1980 | Lerner |
| 4,245,796 A | 1/1981 | Eglinton |
| 4,306,656 A | 12/1981 | Dahlem |
| 4,314,865 A | 2/1982 | Ottaviano |
| 4,354,004 A | 10/1982 | Hughes et al. |
| 4,493,684 A | 1/1985 | Bolton |
| 4,518,654 A | 5/1985 | Eichbauer |
| 4,545,180 A | 10/1985 | Chung et al. |
| 4,564,407 A | 1/1986 | Tsuruta |
| 4,576,669 A | 3/1986 | Caputo |
| 4,597,244 A | 7/1986 | Pharo |
| 4,616,472 A | 10/1986 | Owensby et al. |
| 4,619,635 A | 10/1986 | Ottaviano |
| 4,631,901 A | 12/1986 | Chung et al. |
| 4,664,577 A | 5/1987 | Bonali |
| 4,676,376 A | 6/1987 | Kerswetter |
| 4,787,755 A | 11/1988 | Branson |
| 4,793,123 A | 12/1988 | Pharo |
| 4,847,126 A | 7/1989 | Yamashiro et al. |
| 4,874,093 A | 10/1989 | Pharo |
| 4,904,092 A | 2/1990 | Campbell et al. |
| 4,918,904 A | 4/1990 | Pharo |
| 4,922,687 A | 5/1990 | Chow et al. |
| 4,931,033 A | 6/1990 | Leeds |
| 4,945,714 A | 8/1990 | Bodolay et al. |
| 5,041,317 A | 8/1991 | Greyvenstein |
| 5,070,675 A | 12/1991 | Chuan-Shiang |
| 5,094,657 A | 3/1992 | Dworak et al. |
| 5,117,608 A | 6/1992 | Nease et al. |
| 5,141,494 A | 8/1992 | Danforth et al. |
| 5,181,614 A | 1/1993 | Watts |
| 5,188,691 A | 2/1993 | Caputo |
| 5,203,761 A | 4/1993 | Reichental et al. |
| 5,210,993 A | 5/1993 | van Boxtel |
| 5,216,868 A | 6/1993 | Cooper et al. |
| 5,257,492 A | 11/1993 | Watts |
| 5,272,856 A | 12/1993 | Pharo |
| 5,289,671 A | 3/1994 | Lerner |
| 5,307,969 A | 5/1994 | Menendez |
| 5,340,632 A | 8/1994 | Chappuis |
| 5,351,828 A | 10/1994 | Becker et al. |
| 5,383,837 A | 1/1995 | Watts |
| 5,394,676 A | 3/1995 | Lerner |
| 5,454,642 A | 10/1995 | DeLuca |
| 5,468,525 A | 11/1995 | Watts |
| 5,470,300 A | 11/1995 | Terranova |
| 5,552,003 A | 9/1996 | Hoover et al. |
| 5,651,237 A | 7/1997 | DeLuca |
| 5,693,163 A | 12/1997 | Hoover et al. |
| 5,699,653 A | 12/1997 | Hartman et al. |
| 5,722,218 A | 3/1998 | Lerner |
| 5,733,045 A | 3/1998 | Jostler et al. |
| 5,755,328 A | 5/1998 | DeLuca |
| 5,810,200 A | 9/1998 | Trokhan |
| 5,824,392 A | 10/1998 | Gotoh et al. |
| 5,826,723 A | 10/1998 | Jaszai |
| 5,921,390 A | 7/1999 | Simhaee |
| 5,944,424 A | 8/1999 | Lerner et al. |
| 5,987,856 A | 11/1999 | Lerner |
| 5,996,319 A | 12/1999 | Lerner et al. |
| RE36,501 E | 1/2000 | Hoover et al. |
| 6,015,047 A | 1/2000 | Greenland |
| 6,015,357 A | 1/2000 | Rizza |
| 6,055,796 A | 5/2000 | Lerner et al. |
| RE36,759 E | 7/2000 | Hoover et al. |
| 6,116,000 A | 9/2000 | Perkins et al. |
| 6,170,238 B1 | 1/2001 | Lerner |
| 6,199,349 B1 | 3/2001 | Lerner |
| 6,209,286 B1 | 4/2001 | Perkins et al. |
| 6,213,167 B1 | 4/2001 | Greenland |
| 6,282,716 B1 | 9/2001 | Patterson et al. |
| 6,367,975 B1 | 4/2002 | Cronauer et al. |
| 6,410,119 B1 | 6/2002 | DeLuca et al. |
| 6,423,166 B1 | 7/2002 | Simhaee |
| 6,447,864 B2 | 9/2002 | Johnson et al. |
| 6,460,313 B1 | 10/2002 | Cooper |
| 6,488,222 B1 | 12/2002 | West et al. |
| 6,499,278 B2 | 12/2002 | Cronauer et al. |
| 6,519,916 B1 | 2/2003 | Brown |
| 6,527,147 B2 | 3/2003 | Wehrmann |
| 6,543,201 B2 | 4/2003 | Cronauer et al. |
| 6,550,229 B2 | 4/2003 | Sperry et al. |
| 6,565,946 B2 | 5/2003 | Perkins et al. |
| 6,582,800 B2 | 6/2003 | Fuss et al. |
| 6,625,956 B1 | 9/2003 | Soudan |
| D480,646 S | 10/2003 | Borchard et al. |
| D480,971 S | 10/2003 | DeLuca et al. |
| 6,635,145 B2 | 10/2003 | Cooper |
| 6,651,406 B2 | 11/2003 | Sperry et al. |
| 6,659,150 B1 | 12/2003 | Perkins et al. |
| 6,672,037 B2 | 1/2004 | Wehrmann |
| 6,696,127 B1 | 2/2004 | Mitchell, Jr. |
| D490,711 S | 6/2004 | DeLuca et al. |
| 6,742,317 B2 | 6/2004 | Cronauer et al. |
| 6,751,926 B1 | 6/2004 | Cooper |
| 6,761,960 B2 | 7/2004 | DeLuca et al. |
| 6,786,022 B2 | 9/2004 | Fuss et al. |
| 6,889,739 B2 | 5/2005 | Lerner et al. |
| 6,948,296 B1 | 9/2005 | Lerner et al. |
| 6,952,910 B1 | 10/2005 | Lorsch |
| 6,955,846 B2 | 10/2005 | Lerner |
| D512,311 S | 12/2005 | DeLuca et al. |
| D513,182 S | 12/2005 | DeLuca et al. |
| 7,125,463 B2 | 10/2006 | Lerner et al. |
| 7,165,375 B2 | 1/2007 | O'Dowd |
| 7,223,462 B2 | 5/2007 | Perkins et al. |
| 7,297,387 B2 | 11/2007 | Koyanagi |
| 7,513,090 B2 * | 4/2009 | Wehrmann ......... 53/403 |
| 7,533,772 B2 | 5/2009 | Yoshifusa et al. |
| 7,550,191 B2 | 6/2009 | Lerner |
| 7,552,571 B2 | 6/2009 | Lerner et al. |
| D596,031 S | 7/2009 | Wehrmann |
| 7,571,584 B2 | 8/2009 | Lerner |
| 7,578,333 B2 * | 8/2009 | Greenwood et al. ......... 156/498 |
| D599,118 S | 9/2009 | Perkins et al. |
| D603,705 S | 11/2009 | Wehrmann |
| 7,694,495 B2 | 4/2010 | Wehrmann |
| 7,718,028 B2 | 5/2010 | Lerner et al. |

(56) References Cited

U.S. PATENT DOCUMENTS

| | | | |
|---|---|---|---|
| 7,757,459 B2 | 7/2010 | Wehrmann | |
| 7,767,288 B2 | 8/2010 | Lerner | |
| D630,945 S | 1/2011 | Wehrmann | |
| D633,792 S | 3/2011 | Wehrmann | |
| 7,897,219 B2 | 3/2011 | Wehrmann | |
| 7,897,220 B2 | 3/2011 | Wehrmann | |
| 7,950,433 B2* | 5/2011 | Sperry et al. | 156/361 |
| D646,972 S | 10/2011 | Wehrmann | |
| 8,038,348 B2 | 10/2011 | Lerner | |
| 8,128,770 B2* | 3/2012 | Wetsch et al. | 156/147 |
| 8,307,617 B2 | 11/2012 | Riccardi et al. | |
| 8,357,439 B2 | 1/2013 | Wehrmann | |
| 8,425,994 B2 | 4/2013 | Wehrmann | |
| 2001/0000719 A1 | 5/2001 | Lerner | |
| 2001/0013215 A1 | 8/2001 | Fuss et al. | |
| 2001/0014980 A1 | 8/2001 | Patterson et al. | |
| 2002/0108697 A1 | 8/2002 | Perkins et al. | |
| 2002/0155246 A1 | 10/2002 | Johnson et al. | |
| 2002/0174629 A1 | 11/2002 | Cronauer et al. | |
| 2003/0089082 A1 | 5/2003 | Fuss et al. | |
| 2003/0109369 A1 | 6/2003 | Lerner et al. | |
| 2004/0265523 A1 | 12/2004 | Koyanagi et al. | |
| 2005/0221059 A1 | 10/2005 | Matarasso | |
| 2005/0266189 A1 | 12/2005 | Wehrmann | |
| 2006/0042191 A1 | 3/2006 | Lerner | |
| 2006/0086064 A1 | 4/2006 | Wehrmann | |
| 2006/0090421 A1 | 5/2006 | Sperry | |
| 2006/0218879 A1 | 10/2006 | Garceau et al. | |
| 2007/0054074 A1 | 3/2007 | Wehrmann | |
| 2007/0054075 A1 | 3/2007 | Wehrmann | |
| 2009/0110864 A1 | 4/2009 | Wehrmann | |
| 2009/0293427 A1 | 12/2009 | Lerner et al. | |
| 2010/0192526 A1 | 8/2010 | Wehrmann | |
| 2010/0221466 A1 | 9/2010 | Wehrmann | |
| 2010/0281828 A1 | 11/2010 | Wehrmann | |
| 2010/0282824 A1 | 11/2010 | Kannankeril et al. | |
| 2011/0165352 A1 | 7/2011 | Wehrmann | |
| 2012/0084999 A1 | 4/2012 | Davis et al. | |
| 2012/0214658 A1 | 8/2012 | Chuba | |

FOREIGN PATENT DOCUMENTS

| | | | |
|---|---|---|---|
| EP | 2143555 A1 | 1/2010 | |
| GB | 2384459 | 7/2003 | |
| WO | 9746453 | 12/1997 | |
| WO | 0071423 | 11/2000 | |
| WO | 0153153 | 7/2001 | |
| WO | 0185434 | 11/2001 | |
| WO | 0226589 | 4/2002 | |
| WO | 2005118408 | 12/2005 | |
| WO | 2007070240 | 6/2007 | |
| WO | 2009058749 | 5/2009 | |

OTHER PUBLICATIONS

International Search Report and Written Opinion from PCT/US06/45447, dated Feb. 22, 2007.
International Search Report and Written Opinion from PCT/US08/81410 dated Mar. 31, 2009.
International Search Report and Written Opinion from PCT/US09/38344 dated Dec. 22, 2009.
Office action from U.S. Appl. No. 10/408,946 dated Jun. 7, 2004.
Amendment from U.S. Appl. No. 10/408,946 dated Sep. 23, 2004.
Office action from U.S. Appl. No. 10/408,946 dated Jan. 6, 2005.
Interview Summary from U.S. Appl. No. 10/408,946 dated Mar. 4, 2005.
Response from U.S. Appl. No. 10/408,946 dated Mar. 10, 2005.
Notice of Allowance from U.S. Appl. No. 10/408,946 dated Apr. 25, 2005.
Notice of Allowance from U.S. Appl. No. 10/408,947 dated Dec. 21, 2004.
Office action from U.S. Appl. No. 11/111,164 dated Apr. 27, 2006.
Response from U.S. Appl. No. 11/111,164 dated Jul. 17, 2006.
Notice of Allowance from U.S. Appl. No. 11/111,164 dated Aug. 23, 2006.
Office action from U.S. Appl. No. 11/141,304 dated Nov. 7, 2008.
Amendment from U.S. Appl. No. 11/141,304 dated Jan. 20, 2009.
Office action from U.S. Appl. No. 11/141,304 dated Apr. 28, 2009.
Amendment from U.S. Appl. No. 11/141,304 dated Jun. 24, 2009.
Office action from U.S. Appl. No. 11/141,304 dated Aug. 7, 2009.
Amendment from U.S. Appl. No. 11/141,304 dated Jan. 7, 2010.
Notice of Allowance from U.S. Appl. No. 11/141,304 dated Mar. 31, 2010.
Office action (Restriction) from U.S. Appl. No. 11/194,375 dated Nov. 13, 2006.
Office action from U.S. Appl. No. 11/194,375 dated Feb. 6, 2007.
Amendment from U.S. Appl. No. 11/194,375 dated May 4, 2007.
Office action from U.S. Appl. No. 11/194,375 dated Aug. 21, 2007.
Amendment from U.S. Appl. No. 11/194,375 dated Oct. 2, 2007.
Advisory action from U.S. Appl. No. 11/194,375 dated Oct. 9, 2007.
Office action from U.S. Appl. No. 11/194,375 dated Nov. 20, 2007.
Amendment from U.S. Appl. No. 11/194,375 dated Feb. 29, 2008.
Office action from U.S. Appl. No. 11/194,375 dated Jun. 2, 2008.
Amendment from U.S. Appl. No. 11/194,375 dated Aug. 4, 2008.
Advisory action from U.S. Appl. No. 11/194,375 dated Aug. 12, 2008.
Office action from U.S. Appl. No. 11/194,375 dated Sep. 19, 2008.
Amendment from U.S. Appl. No. 11/194,375 dated Dec. 19, 2008.
Notice of Allowance from U.S. Appl. No. 11/194,375 dated Apr. 10, 2009.
Office action from U.S. Appl. No. 11/252,365 dated Jan. 31, 2008.
Amendment from U.S. Appl. No. 11/252,365 dated Mar. 18, 2008.
Notice of Allowance from U.S. Appl. No. 11/252,365 dated Feb. 27, 2009.
Amendment after Allowance from U.S. Appl. No. 11/252,365 dated Mar. 4, 2009.
Office action from U.S. Appl. No. 11/299,933 dated Mar. 19, 2008.
Response from U.S. Appl. No. 11/299,933 dated Jun. 3, 2008.
Office action from U.S. Appl. No. 11/299,933 dated Sep. 16, 2008.
Response from U.S. Appl. No. 11/299,933 dated Nov. 17, 2008.
Office action from U.S. Appl. No. 11/299,933 dated Dec. 18, 2008.
Amendment from U.S. Appl. No. 11/299,933 dated Mar. 6, 2009.
Office action from U.S. Appl. No. 11/299,933 dated Jun. 12, 2009.
Response to Office action from U.S. Appl. No. 11/299,933 dated Dec. 9, 2009.
Office action from U.S. Appl. No. 11/299,933 dated Dec. 31, 2009.
Response from U.S. Appl. No. 11/299,933 dated Mar. 30, 2010.
Office action from U.S. Appl. No. 11/299,933 dated Jun. 14, 2010.
Response from U.S. Appl. No. 11/299,933 dated Oct. 14, 2010.
Notice of Allowance from U.S. Appl. No. 11/299,933 dated Dec. 28, 2010.
Office action from U.S. Appl. No. 11/496,654 dated Apr. 1, 2009.
Response from U.S. Appl. No. 11/496,654 dated Jun. 26, 2009.
Office action from U.S. Appl. No. 11/496,654 dated Aug. 11, 2009.
Amendment from U.S. Appl. No. 11/496,654 dated Dec. 11, 2009.
Office action from U.S. Appl. No. 11/496,654 dated Jan. 13, 2010.
Amendment from U.S. Appl. No. 11/496,654 dated Jun. 14, 2010.
Office action from U.S. Appl. No. 11/496,654 dated Jun. 28, 2010.
Pre-Appeal Brief Request and Notice of Appeal from U.S. Appl. No. 11/496,654 dated Nov. 29, 2010.
Office action from 11/496,645 dated Aug. 31, 2009.
Response from U.S. Appl. No. 11/496,645 dated Nov. 30, 2009.
Notice of Allowance from U.S. Appl. No. 11/496,645 dated Jan. 4, 2010.
Notice of Allowance from U.S. Appl. No. 11/496,645 dated Feb. 26, 2010.
Office action from U.S. Appl. No. 11/594,539 dated Apr. 19, 2010.
Response from U.S. Appl. No. 11/594,539 dated Jul. 19, 2010.
Office action from U.S. Appl. No. 11/594,539 dated Sep. 30, 2010.
Interview Summary from U.S. Appl. No. 11/594,539 dated Dec. 15, 2010.
Notice of Allowance from U.S. Appl. No. 11/594,539 dated Jan. 7, 2011.
Office action from U.S. Appl. No. 11/594,540 dated Sep. 3, 2010.
Response from U.S. Appl. No. 11/594,540 dated Dec. 3, 2010.
Office action from U.S. Appl. No. 11/594,540 dated Feb. 3, 2011.

(56) References Cited

OTHER PUBLICATIONS

Notice of Allowance from U.S. Appl. No. 29/332,921 dated Aug. 11, 2009.
Office action from U.S. Appl. No. 12/409,026 dated Feb. 4, 2010.
Response from U.S. Appl. No. 12/409,026 dated May 3, 2010.
Notice of Allowance from U.S. Appl. No. 12/409,026 dated Jun. 17, 2010.
Office action from U.S. Appl. No. 12/818,318 dated Dec. 10, 2010.
Office action from U.S. Appl. No. 12/507,220 dated Oct. 22, 2009.
Response to Office action from U.S. Appl. No. 12/507,220 dated Apr. 16, 2010.
Office action from U.S. Appl. No. 12/507,220 dated May 6, 2010.
Response from U.S. Appl. No. 12/507,220 dated Aug. 5, 2010.
Office action from U.S. Appl. No. 12/507,220 dated Aug. 12, 2010.
Amendment from U.S. Appl. No. 12/507,220 dated Dec. 13, 2010.
Office action from U.S. Appl. No. 12/507,220 dated Jan. 28, 2011.
Notice of allowance from U.S. Appl. No. 29/346,902 dated Sep. 9, 2010.
One page drawing, Briggs Bag 1, illustrates a web of pre-formed bags sold by Applicant for use in Applicant's SP machines more than one year prior to the priority date of the present application. Operation of Applicant's SP machines is disclosed by U.S. Pat. Nos. 4,969,310; 5,743,070; 5,944,424; 5,722,218; and 6,035,611.
Response from U.S. Appl. No. 11/496,654 dated May 31, 2011.
Office Action from U.S. Appl. No. 12/394,781 dated Jun. 10, 2011.
Notice of Allowance from U.S. Appl. No. 11/496,654 dated Jun. 20, 2011.
Response from U.S. Appl. No. 11/594,540 dated Jul. 5, 2011.
Office Action from U.S. Appl. No. 11/594,540 dated Jul. 22, 2011.
Office Action from U.S. Appl. No. 12/818,318 dated Jul. 29, 2011.
Office Action from European Application No. 04252036.1 dated Jul. 19, 2011.
Search Report from European Application No. 05755434.7 dated Jul. 22, 2011.
Office Action from U.S. Appl. No. 12/259,419 dated Sep. 16, 2011.
Response from U.S. Appl. No. 12/394,781 dated Oct. 10, 2011.
Response from U.S. Appl. No. 11/594,540 dated Dec. 15, 2011.
Amendment in Response to Non Final Office Action in U.S. Appl. No. 12/259,419 dated Dec. 7, 2011.
Final Office Action from U.S. Appl. No. 121394,781 dated Feb. 15, 2012.
Response to Final Office Action from U.S. Appl. No. 12/818,318 dated Dec. 29, 2011.
Response from European Application No. 04252036.1 dated Nov. 15, 2011.
Final Office Action from U.S. Appl. No. 11/594,540 dated Mar. 5, 2012.
Office Action from U.S. Appl. No. 12/818,318 dated Mar. 8, 2012.
Response to Examiner's Report for Canadian Application No. 2,569,049 dated Apr. 11, 2012.
Communication from EP Application No. 05755434.7 dated Apr. 11, 2012.
Response to Non-Final Office Action from U.S. Appl. No. 13/036,172 dated Jun. 11, 2012.
Further Examination Report from EP Application No. 06838429.6 dated Apr. 30, 2012.
Response from EP Application No. 09789543.7 dated May 24, 2012.
Reasons for Requesting Pre-Appeal Brief Review from U.S. Appl. No. 12/259,419 dated Jun. 18, 2012.
Response to Office Action and Request for RCE from U.S. Appl. No. 11/594,540 dated Jun. 28, 2012.
Response to Office Action from U.S. Appl. No. 12/818,318 dated Jul. 9, 2012.
Office Action from U.S. Appl. No. 11/594,540 dated Jul. 16, 2012.
Final Office Action from U.S. Appl. No. 12/818,318 dated Aug. 8, 2012.
Reasons for Requesting Pre-Appeal Brief Review from U.S. Appl. No. 12/394,781 dated Aug. 3, 2012.
Office Action from U.S. Appl. No. 13/036,172 dated Aug. 21, 2012.
Response to Communication from EP Application No. 05755434.7 dated Aug. 3, 2012.
Notice of Allowance and Fees due for U.S. Appl. No. 12/259,419 dated Sep. 24, 2012.
Office Action from U.S. Appl. No. 29/383,234 dated Mar. 9, 2011.
Response from U.S. Appl. No. 29/383,234, filed Jun. 7, 2011.
Notice of Allowance from U.S. Appl. No. 29/383,234 dated Jul. 12, 2011.
Office action from Canadian Application No. 2,463,389 dated Apr. 23, 2010.
Response from Canadian Application No. 2,463,389 dated Oct. 25, 2010.
Office action from Canadian Application No. 2,463,357 dated Oct. 20, 2010.
Notification of References Cited regarding Canadian Application No. 2,569,049 dated Dec. 21, 2011.
Communication from European Application No. 05755434.7 dated Feb. 21, 2011.
Communication from EP Application No. 06838429.6 dated Jun. 14, 2011.
Response from EP Application No. 06838429.6 dated Oct. 21, 2011.
Response to Office Action in U.S. Appl. No. 11/594,540 dated Oct. 15, 2012.
Response from U.S. Appl. No. 12/818,318 dated Jun. 10, 2011.
International Search Report and Written Opinion for PCT/US12/45718 dated Oct. 22, 2012.
Examination Report from Canadian Application No. 2,569,049 dated Aug. 8, 2012.
Response to Final Office Action with Terminal Disclaimer from U.S. Appl. No. 13/036,172 dated Oct. 26, 2012.
Office Action from U.S. Appl. No. 13/036,170 dated Nov. 26, 2012.
Office action from U.S. Appl. No. 13/036,170 dated Aug. 16, 2013.
Office action from U.S. Appl. No. 13/866,165 dated Sep. 18, 2013.
Supplemental Notice of Allowance for U.S. Appl. No. 11/594,540 dated Mar. 4, 2013.
Notice of Panel Decision from Pre-Appeal Brief Review for U.S. Appl. No. 12/394,781 dated Aug. 22, 2012.
Amendment with RCE for U.S. Appl. No. 12/818,318 dated Feb. 6, 2013.
Response to Office Action for U.S. Appl. No. 13/036,170 dated May 28, 2013.
Office Action for U.S. Appl. No. 13/739,049 dated Jun. 20, 2013.
First Examiner's Report in Canadian Patent Application No. 2,633,899 dated Jan. 21, 2013.
Amendment in Response to office action in U.S. Appl. No. 12/394,781 dated Jul. 2, 2013.
Office action from U.S. Appl. No. 12/818,318 dated Jul. 12, 2013.
Examiner-Initiated Interview Summary from U.S. Appl. No. 12/259,419 dated Dec. 7, 2012.
Notice of Allowance in U.S. Appl. No. 11/594,540 dated Dec. 28, 2012.
Office Action for U.S. Appl. No. 12/394,781 dated Jan. 3, 2013.
Final Office Action in U.S. Appl. No. 12/394,781 dated Oct. 11, 2013.
Non-Final Office Action from U.S. Appl. No. 12/394,781 dated Dec. 16, 2014.
Office action for U.S. Appl. No. 13/739,049 dated Jan. 28, 2014.
Response to Office Action for U.S. Appl. No. 13/739,049 dated Mar. 5, 2014.
Final Office Action for U.S. Appl. No. 13/739,049 dated Mar. 28, 2014.
Response to Office Action in U.S. Appl. No. 12/818,318 dated Dec. 12, 2013.
Final Office Action from U.S. Appl. No. 12/818,318 dated Feb. 26, 2014.
Amendment with RCE for U.S. Appl. No. 13/036,170 dated Feb. 14, 2014.
Non-final Office Action from U.S. Appl. No. 13/036,170 dated Mar. 27, 2014.
Final Office Action from U.S. Appl. No. 13/036,170 dated Dec. 3, 2014.
Response in U.S. Appl. No. 13/866,165 dated Mar. 14, 2014.
Office Action for U.S. Appl. No. 13/866,165 dated May 21, 2014.
Office Action for U.S. Appl. No. 13/866,165 dated Nov. 10, 2014.

(56) References Cited

OTHER PUBLICATIONS

Office Action from U.S. Appl. No. 13/543,082 dated Jun. 19, 2014.
International Search Report and Written Opinion for PCT/US2014/030424 dated Aug. 8, 2014.
Amendment in Response to Non-Final Office Action in U.S. Appl. No. 12/259,419 dated Dec. 7, 2011.
Office action from U.S. Appl. No. 12/259,419 dated Jan. 18, 2012.
Examiner Initiated Interview Summary in U.S. Appl. No. 12/259,419 dated Dec. 7, 2012.
Office Action from U.S. Appl. No. 13/036,172 dated Jan. 9, 2012.
Notice of Allowance for U.S. Appl. No. 13/036,172 dated Nov. 16, 2012.
Response to Office Action from U.S. Appl. No. 12/394,781 dated Apr. 16, 2015.
Notice of Appeal, Pre-Appeal Brief Request for Review and Reasons for Request for Pre-Appeal Brief Review for U.S. Appl. No. 13/739,049 dated Sep. 25, 2014.
Office Action for U.S. Appl. No. 13/739,049 dated Mar. 10, 2015.
Response to Office Action for U.S. Appl. No. 13/866,165 dated Apr. 6, 2015.
International Search Report and Written Opinion for PCT/US2014/054965 dated Feb. 10, 2015.
Notice of Allowance from U.S. Appl. No. 12/394,781 dated Aug. 4, 2015.
Final Office Action for U.S. Appl. No. 13/866,165 dated Jun. 18, 2015.
One page drawing, Goody Bag 1, illustrates a web of pre-formed bags sold by Applicant for use in Applicant's SP machines more than one year prior to the priority date of the present application. Operation of Applicant's SP machines is disclosed by U.S. Pat. Nos. 4,969,310; 5,743,070; 5,944,424; 5,722,218; and 6,035,611.

\* cited by examiner

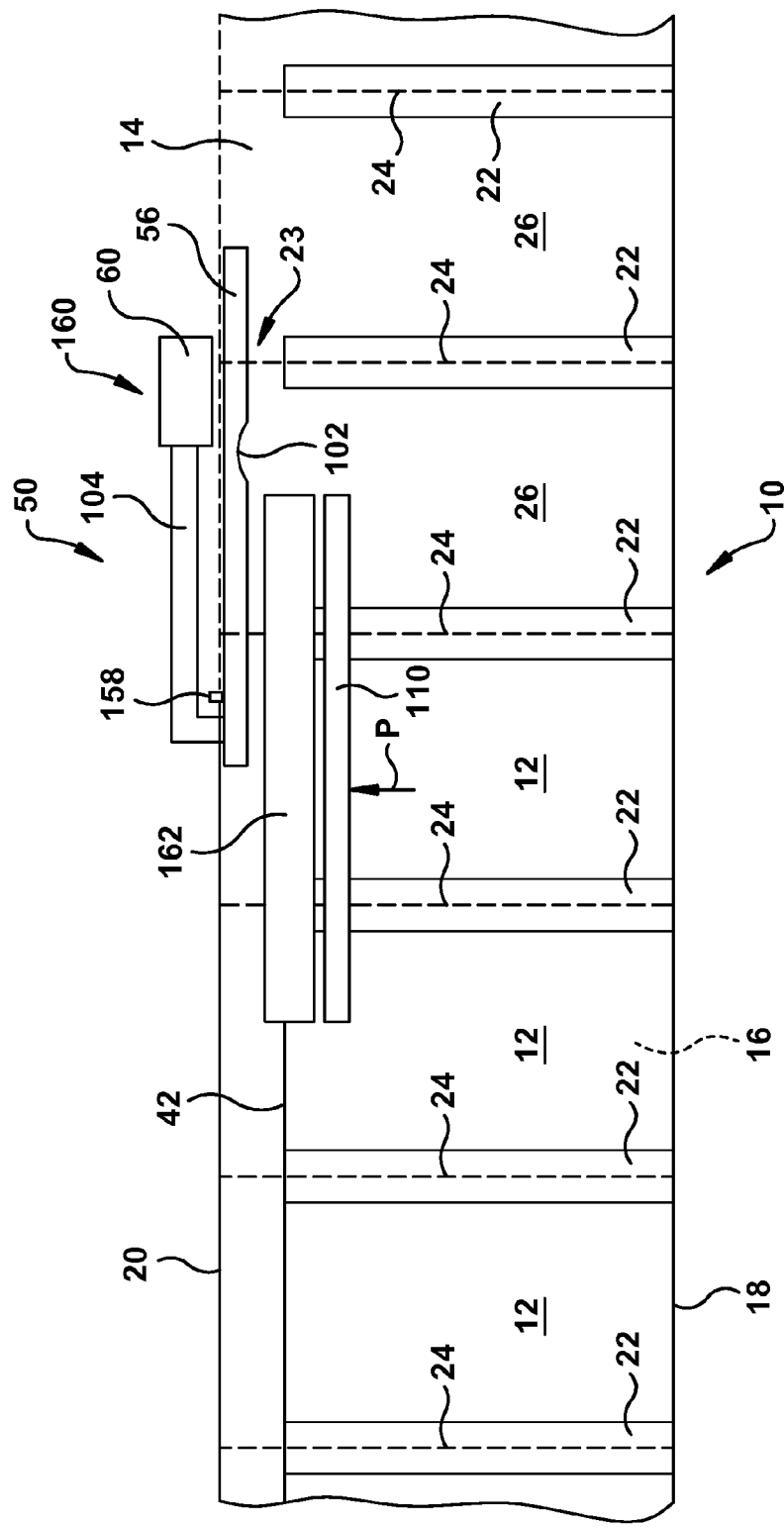

ically 2, 2011, 61/505,261, entitled AIR CUSH-
AIR CUSHION INFLATION MACHINE

CROSS-REFERENCE TO RELATED-APPLICATION

This application claims the benefit of U.S. Provisional Patent Application Ser. No. 61/505,261, entitled AIR CUSHION INFLATION MACHINE and filed Jul. 7, 2011, the entire disclosure of which is incorporated herein by reference, to the extent that it is not conflicting with the present application.

FIELD OF THE INVENTION

The present invention relates to fluid filled units and more particularly to a novel and improved machine for converting a web of preformed pouches to dunnage units.

BACKGROUND

Machines for forming and filling dunnage units from sheets of plastic are known. Machines which produce dunnage units by inflating preformed pouches in a preformed web are also known. For many applications, machines which utilize preformed webs are preferred.

BRIEF DESCRIPTION OF THE DRAWINGS

FIG. 2 is a view similar to FIG. 1A with a web of air cushion material installed in the air cushion inflation machine.

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

Figure 1:
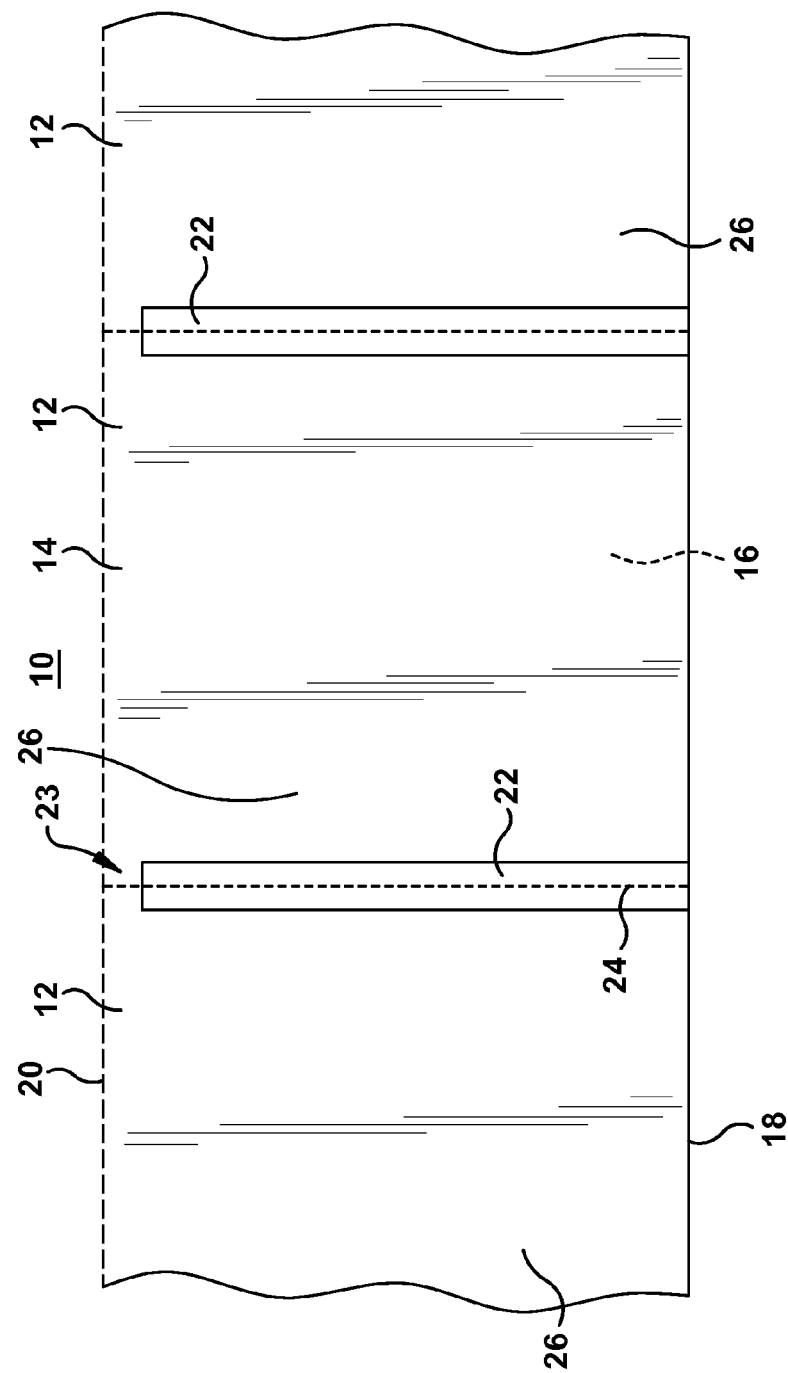
FIG. 1 is a plan view of an exemplary embodiment of air cushion material.
Figure 1A:
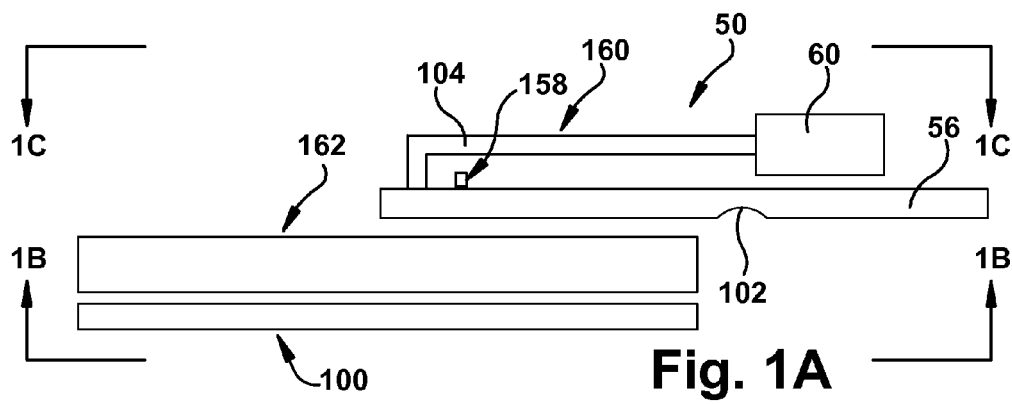
FIG. 1A is a top plan view of an exemplary embodiment of an air cushion inflation machine.
Figure 2A:
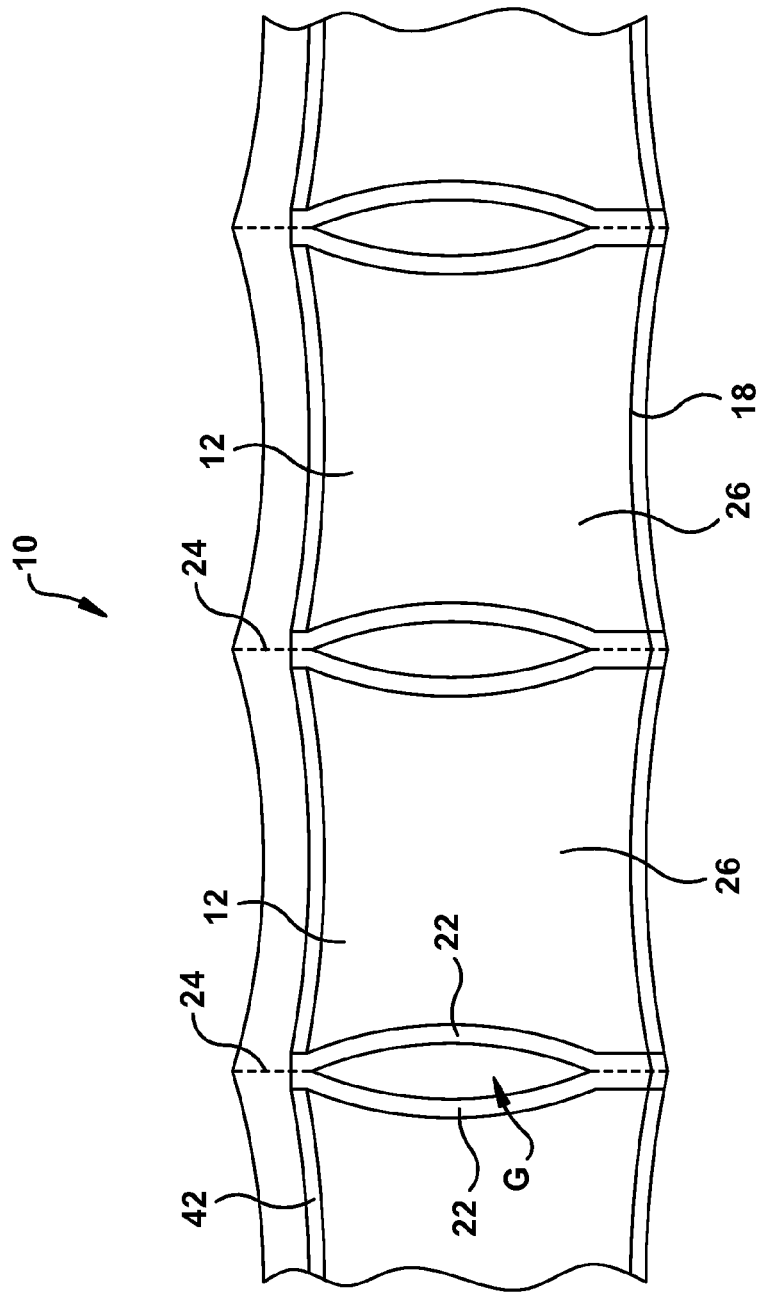
FIG. 2A is a plain view of inflated and sealed air cushions.

FIG. 1 illustrates an example of a preformed web 10 that can be processed by a new machine 50 (See FIGS. 1A and 8) to produce inflated air cushions 12 (See FIG. 2A). The preformed web can take a wide variety of different forms. Any preformed web that can be inflated, sealed and then separated from the machine 50 can be used. Examples of acceptable webs 10 include, but are not limited to, any of the webs shown and/or described by U.S. Pat. Nos. D633792; 7,897,220; 7,897,219; D630945; 7,767,288; 7,757,459; 7,718,028; 7,694,495; D603705; 7,571,584; D596031; 7,550,191; 7,125,463; 7,125,463; 6,889,739; or 7,975,457; or United States Patent Application Pub. Nos.: 20100281828A1; 20100221466A1; 20090293427A1; and 20090110864A1, which are all incorporated herein by reference in their entirety. It should be readily apparent that other preformed webs could be used in the machine 50 to produce dunnage units.

The illustrated web 10 is formed of a heat sealable plastic film, such as polyethylene. However, any heat sealable material can be used. The web 10 includes superposed top and bottom, elongate layers 14, 16 connected together along spaced seal and inflation side edges 18, 20. Each of the edges may be either a fold or a seal. The superposed layers 14, 16 are hermetically connected along the seal side edge 18. In the illustrated embodiment, the inflation side edge 20 is perforated. In another embodiment, the inflation side edge 20 is not perforated and a line of perforations is included in one of the layers 14, 16, with the line of perforations being spaced apart from and running parallel to the inflation side edge 20. In another embodiment, the inflation side edge 20 is not perforated and a line of perforations is included in each of the layers 14, 16, with the lines of perforations being spaced apart from and running parallel to the inflation side edge 20. In yet another embodiment, the layers 14, 16 are not connected together at the inflation side edge.

A plurality of longitudinally spaced, transverse seals 22 join the top and bottom layers 14, 16. Referring to FIGS. 1 and 2, the transverse seals 22 extend from the seal edge 18 to within a short distance of the inflation edge 20 to form pouches 26. An optional pocket 23 is formed between the transverse seals 22 and the inflation edge 20. A pocket is not formed if the inflation edges of the layers 14, 16 are not connected. A line of perforations 24 extends through the top and bottom layers. FIG. 2A illustrates a length of the web 10 after it has been inflated and sealed to form inflated cushions 12. An inflation seal 42, closes the pouches 26 defined by the transverse seals 22 and the seal side edge 18 to form the inflated cushions. The illustrated inflated cushions 12 include gaps G between each pair of adjacent cushions. A web 10 that is specially constructed to form the gaps G was used in the illustrated embodiment. In other embodiments, a web 10 may be used that does not form the illustrated gaps G.

FIGS. 1A-1C and 2 schematically illustrate an exemplary embodiment of a machine 50 for converting a preformed web 10 (see FIG. 1) to inflated cushions 12 (see FIG. 2A). The machine 50 may take a wide variety of different forms and the inflation, sealing and separation arrangements described below may be in the order/positions described or in any other order/position that facilitates inflation of the web 10, sealing of the web, and separation of the web from the machine 50. In the example illustrated by FIGS. 1A-1C and 2, the machine 50 includes an inflation arrangement 160, a sealing arrangement 162, a clamping arrangement 110, and a web separation device 158.

The inflation arrangement 160 can take a wide variety of different forms. Any arrangement capable of providing air under increased pressure (above atmosphere) to the pouches 26 can be used. In the illustrated embodiment, the inflation arrangement 160 includes a hollow, longitudinally extending guide pin 56 and a blower 60. Referring to FIG. 2, a web 10 is routed from a supply and the pocket 23 is placed around the guide pin 56, such that the guide pin 56 is between the inflation side edge 20 and the transverse seals 22. The guide pin 56 aligns the web as it is pulled through the machine 50. The guide pin 56 includes an inflation opening 102 that is fluidly connected to the blower 60 by a conduit 104. The blower 60 inflates the web pouches 26 as the web moves past the inflation opening 102.

In an exemplary embodiment, the inflation arrangement 160 also includes a blower control 106. The blower control 106 can take a wide variety of different forms. For example, the blower control 106 can be any arrangement that is operable to control the flow rate and/or pressure of air provided by the inflation arrangement 160 to the pouches 26. In one embodiment, the blower control 106 is a speed controller that controls the operation speed of the blower. Such a speed controller speeds the blower up to provide air at higher pressures and/or flow rates and reduces the blower speed to reduce the pressure and/or flow rate. In another embodiment, the blower control 106 comprises a flow control valve in the conduit 104 between the blower 60 and the inflation opening 102.

Figure 1C:
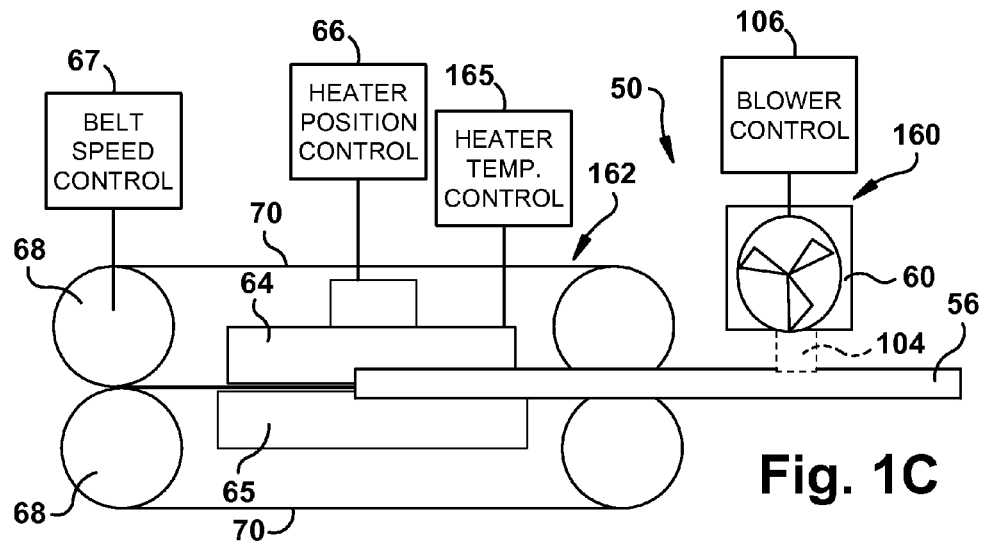
FIG. 1C is a view taken along lines 1C-1C in FIG. 1A.

The sealing arrangement 162 forms the seal 42 (FIG. 2) to create sealed inflated cushions 12. The sealing arrangement 162 can take a wide variety of different forms. For example, the sealing arrangement 162 can be any arrangement capable of forming a hermetic seal between the layers 14, 16. Referring to FIG. 1C, the sealing arrangement 162 includes a heated sealing element 64, a heat sealing backing member or a second heated sealing element 65, a temperature control arrangement 165, a heat sealing element positioning device 66, a pair of drive rollers 68, a belt speed control 67, and a pair of drive belts 70. In an alternate embodiment, a pair of cooling elements are provided downstream of the heated sealing element 64 and the heat sealing backing member 65. Each belt 70 is provided around its respective drive roller and its respective heat sealing element 64 or backing member 65. Each belt 70 is driven by its respective drive roller 68. The speed of the drive rollers 68 and belts 70 are controlled by the belt speed control 67. The belts 70 are in close proximity or engage one another, such that the belts 70 pull the web 10 through the heat sealing element 64 and the heat sealing backing member or a second heated sealing element 65. The seal 42 is formed as the web 10 passes through first the heated sealing elements 64 and the heat sealing backing member or a second heated sealing element 65.

The heating element 64 can take a wide variety of different forms. Any arrangement capable of raising the temperature of the layers 14 and/or 16 to a point where the layers will hermetically bond together can be used. For example, the heating element 64 may be a heating wire, ceramic element or other member that provides heat upon the application of power. For example, resistance of the heating element 64 causes the heating element 64 to heat up when voltage is applied across the heating element.

Referring to FIG. 1C, in the illustrated embodiment the temperature control arrangement 165 is coupled to the heating element 64 to control the temperature of the heating element. The temperature control arrangement 165 may take a wide variety of different forms. Any arrangement capable of controlling the heating element 64 can be used. In one exemplary embodiment, the temperature control arrangement 165 includes a thermocouple. The thermocouple may be coupled to the heating element 64 in a variety of different ways. In one exemplary embodiment, the heating element 64 includes a ceramic member that is encapsulated with the thermocouple. The encapsulation of the ceramic member with the thermocouple provides for very accurate measurement of the temperature of the heating element 64. The temperature measured by the thermocouple is used to adjust the power applied to the heating element and thereby control the temperature of the heating element.

In the illustrated embodiment, the heat sealing element positioning device 66 is coupled to the heating element 64 to position the heating element 64 with respect to the path of travel of the web 10. The heat sealing element positioning device 66 may take a wide variety of different forms. Any arrangement capable of positioning the heating element 64 with respect to the path of travel of the web 10 may be employed. For example, the heat sealing element positioning device 66 may be an actuator that moves the upper belt 70, drive roller 68, and heated sealing element 64 relatively away from the lower belt, drive roller, and heat sealing backing member or a second heated sealing element 65. Or, the heat sealing element positioning device 66 may be an actuator that moves the heated sealing element 64 away from the upper belt (see FIG. 4D). The heat sealing element positioning device 66 may be used to quickly control when heat is applied and removed from the web layers 14, 16 by the heating element 64. For example, the heat sealing element positioning device is operable to remove heat from the seal when the machine is idle.

Figure 1B:
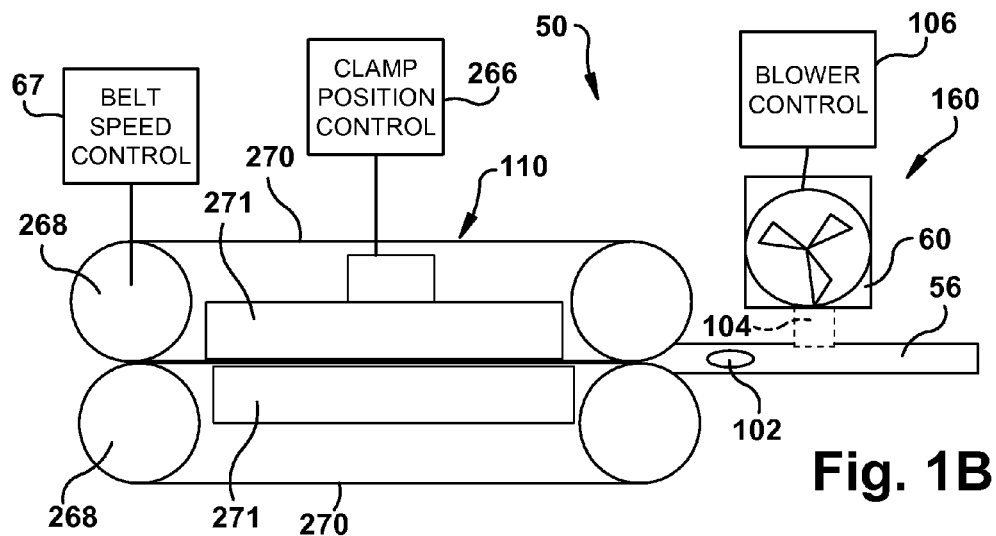
FIG. 1B is a view taken along lines 1B-1B in FIG. 1A.

FIG. 1B illustrates an exemplary embodiment of a clamping arrangement. The clamping arrangement 110 is positioned to pinch the top and bottom layers 14, 16 two layers of the preformed web together. The clamping arrangement 110 inhibits air under pressure P (FIG. 2) in the inflated webs from applying force to the molten longitudinal seal 42. This prevents the air under pressure P from blowing the molten longitudinal seal 42 open and/or creating undesirable stresses that weaken the longitudinal seal.

The clamping arrangement 110 can take a wide variety of different forms. For example, the clamping arrangement 110 can be any arrangement capable of squeezing the layers 14, 16 in an area where the material of the layers is molten, soft or not yet completely solidified and cool. In the illustrated embodiment of FIG. 1B, the clamping arrangement 110 includes a pair of drive rollers 268, and a pair of drive belts 270, a pair of clamping members 271 and an optional clamping member positioning device 266. Each belt 270 is disposed around its respective drive roller 268. Each belt 270 is driven by its respective drive roller 268. The drive rollers 268 may be coupled to the drive rollers 68 of the heat sealing belts 70 or the drive rollers 268 may be driven independently of the drive rollers 68. The belts 270 engage one another, such that the belts 270 pull the web 10 and pinch the web as the web moves through the heat sealing element 64 and the heat sealing backing member or a second heated sealing element 65. Another exemplary clamping arrangement is disclosed by U.S. Pat. No. 7,571,584, which is incorporated herein by reference in its entirety.

In the illustrated embodiment, the clamping arrangement 110 includes a positioning device 266. The positioning device 266 is coupled to the clamping arrangement to selectively grip and release the web 10. This allows the web 10 to be manually loaded into the machine, allows the web to be manually removed from the machine, and/or allows any misfeeds of the web 10 to be cleared. The positioning device 266 may take a wide variety of different forms. Any arrangement capable of positioning the belt(s) 270 of the clamping arrangement 110 with respect to the path of travel of the web 10 may be employed. For example, the clamping arrangement positioning device 266 may be an actuator that moves the upper belt 270 relatively away from the lower belt.

Referring to FIG. 2, the web separation device 158 can take a wide variety of different forms. For example, when the web 10 includes a line of perforations at or along the seal side edge 18, the web separation device 158 may be a blunt surface, when the inflation edge 20 is not perforated the separation device 158 may be a sharp knife edge, and when the layers 14, 16 are not connected together at the seal side edge the web separation device may be omitted. In the illustrated embodiment, the web separation device 158 is positioned along the path of travel of the web at the heat sealing element 64. The web separation device 158 is positioned behind the heat sealing element so that the web separation device opens the pocket 23 of the web at the same time the pouches 26 are being sealed. However, the web separation device can be positioned anywhere along the path of travel of the web. For example, the web separation device 158 can be positioned before the sealing arrangement 162, after the sealing arrangement, before the inflation opening 102, or after the inflation opening. The illustrated separation device 158 extends from the pin 56. However, the separation device 158 may be mounted to the machine 50 in any manner. The separation device 158 opens the web 10 at or near the inflation side edge 20 as the web moves through the machine 50.

Figure 3:
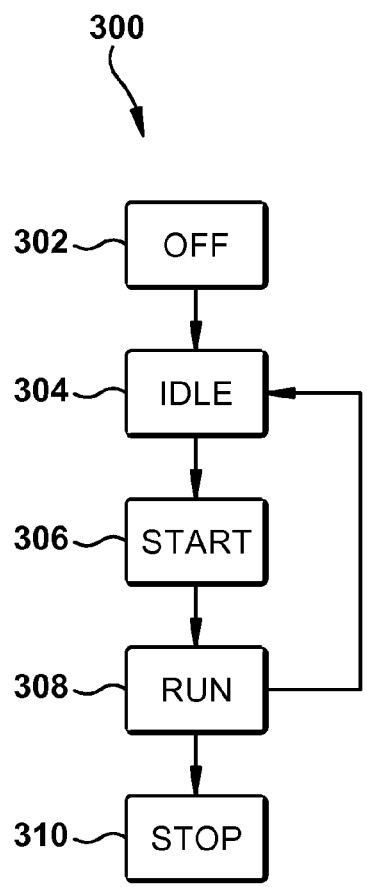
FIG. 3 is a flow chart illustrating an exemplary embodiment of a control algorithm for an air cushion inflation machine.

FIG. 3 illustrates an exemplary embodiment of a control algorithm 300 for the inflation machine 50. In the illustrated embodiment, the control algorithm 300 includes an off state 302, an idle sequence 304, a start sequence 306, a run sequence 308, and a stop sequence 310. In the off state, the inflation arrangement 160 and the sealing arrangement 162 are both turned off.

Figure 4A:
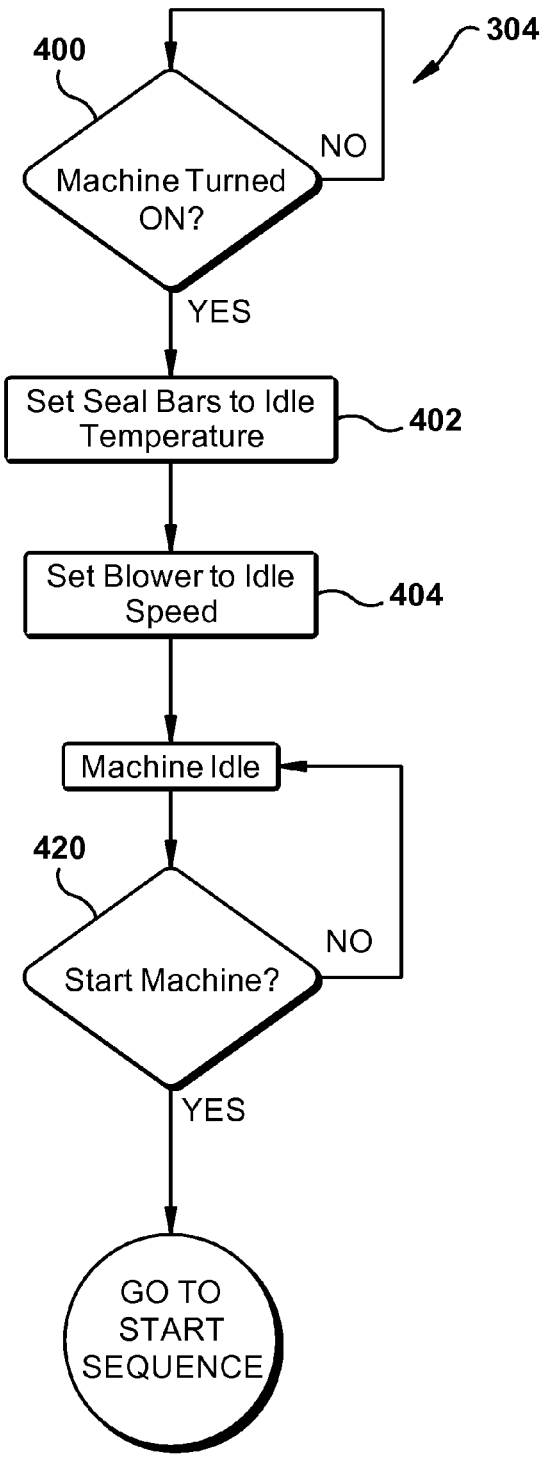
FIG. 4A is a flow chart illustrating an exemplary embodiment of an idle sequence of a control algorithm for an air cushion inflation machine.
Figure 4D:
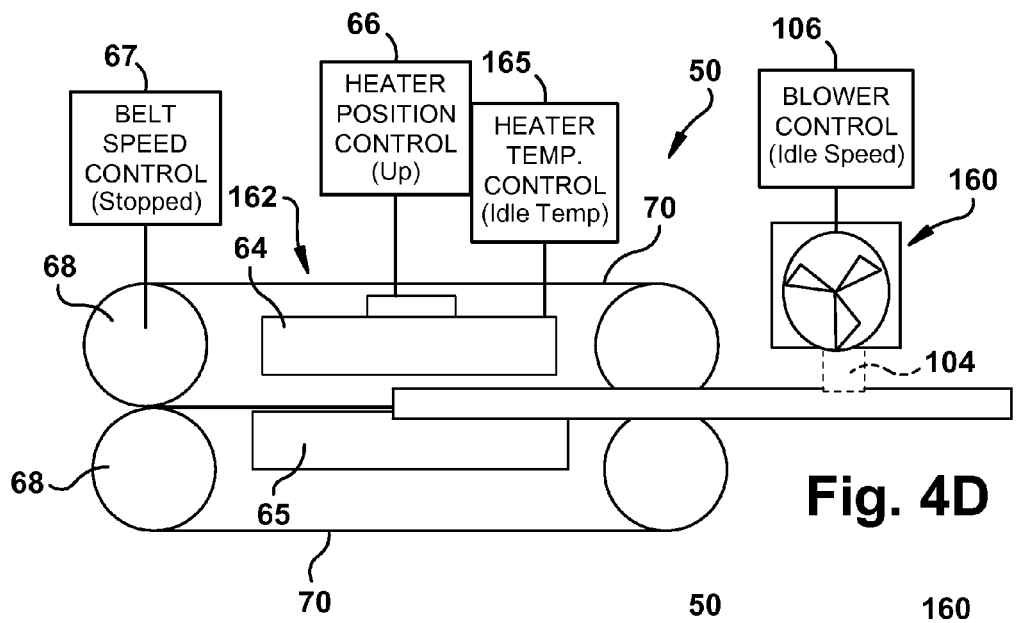
FIGS. 4B-4D illustrate an example of states of components of an air cushion inflation machine when the air cushion inflation machine is in an idle condition.
Figure 4B:
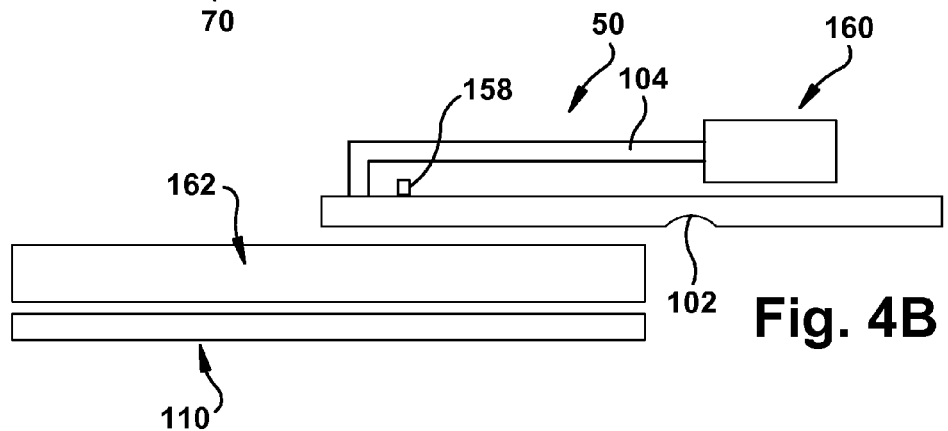
Figure 4C:
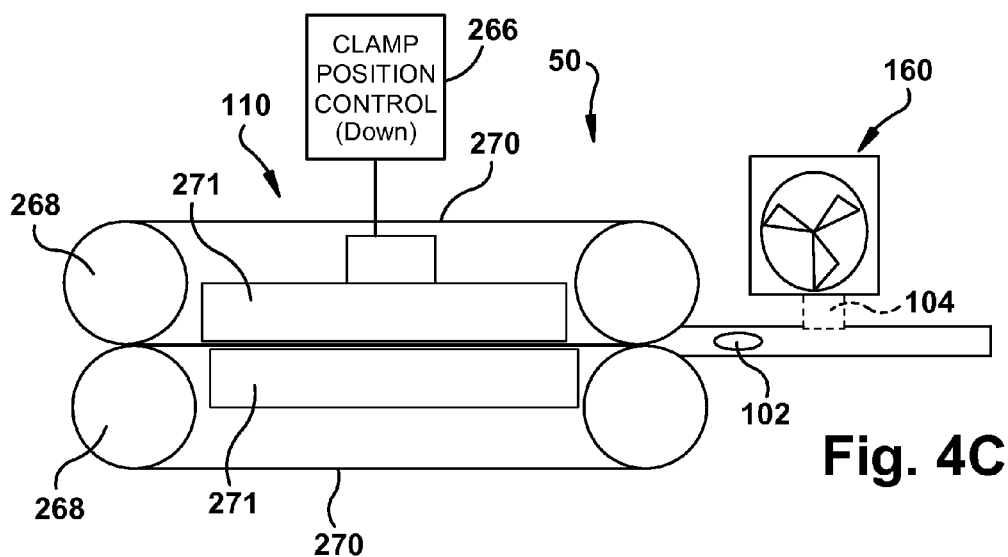

FIG. 4A illustrates the idle sequence 304 and FIGS. 4B-4D illustrate the states of the components of the machine 50 when the machine executes the idle sequence. When the machine 50 is turned on 400, the machine begins the idle sequence 304. In the idle sequence 304, the sealing elements 64 are set 402 to an idle temperature by the temperature control arrangement 165. The inflation arrangement 160 is set 404 to an idle output or speed by the inflation control 106. Referring to FIG. 4D, in an exemplary embodiment, the belt speed control 67 stops the belts 70, 270, the positioning device 66 separates the heating element 64 from the web 10, and the positioning device 266 optionally causes the clamping device 110 to clamp the web 10. As such, when the machine 50 executes the idle sequence 304, the inflation arrangement 160 pre-inflates the pouches 26 and the heating element 64 is pre-heated, but spaced apart from the web. This pre-inflation and pre-heating reduces the time it takes for the machine 10 to transition to production of inflated cushioning members.

Figure 5A:
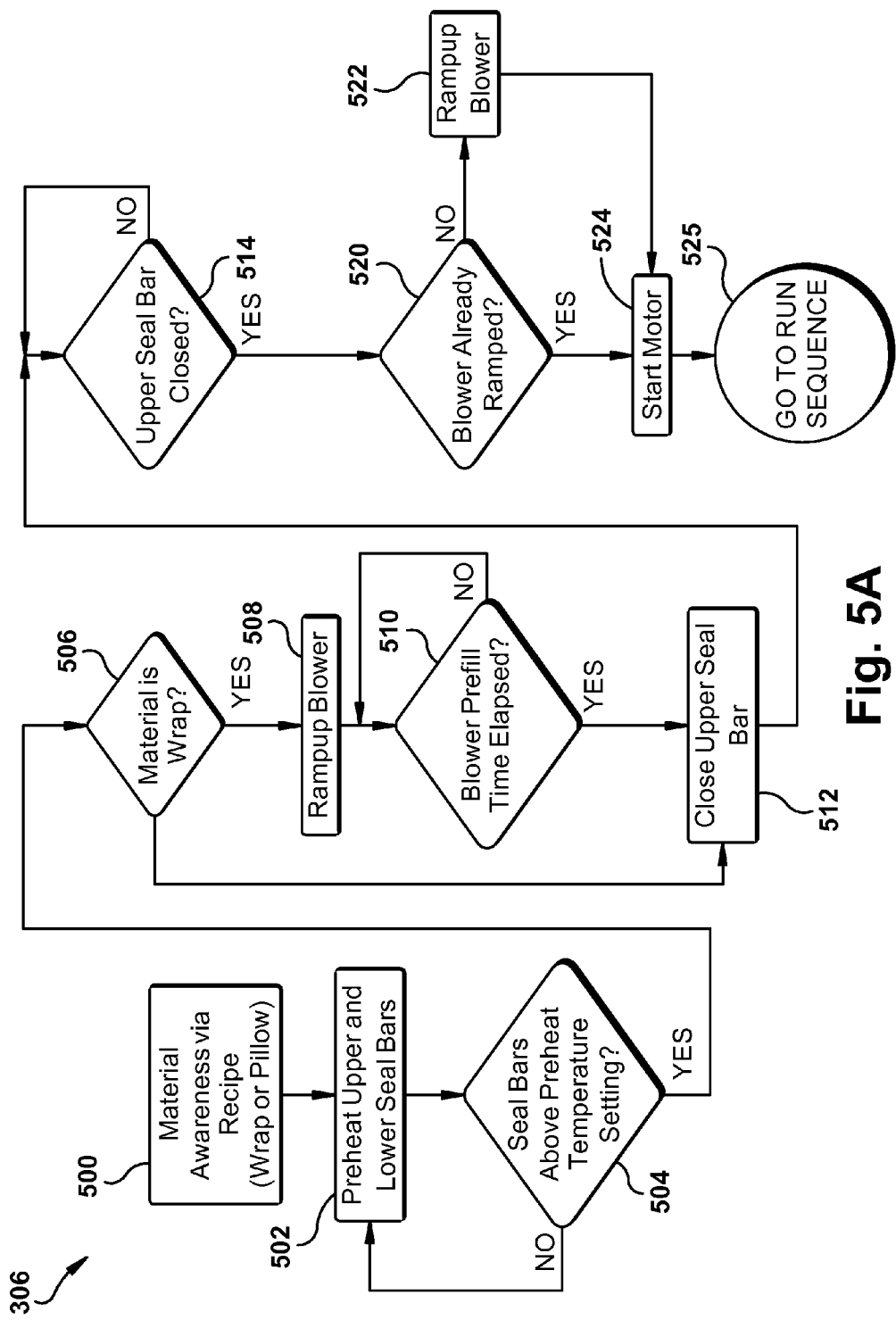
FIG. 5A is a flow chart illustrating an exemplary embodiment of a start sequence of a control algorithm for an air cushion inflation machine.
Figure 5D:
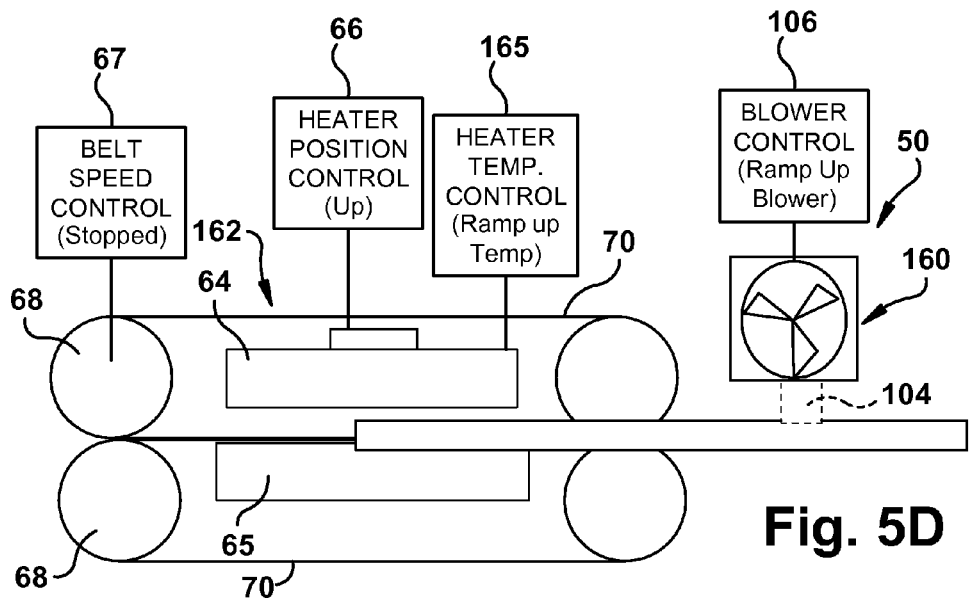
FIGS. 5B-5G illustrate an example of states of components of an air cushion inflation machine when the air cushion inflation machine is in a start condition.
Figure 5B:
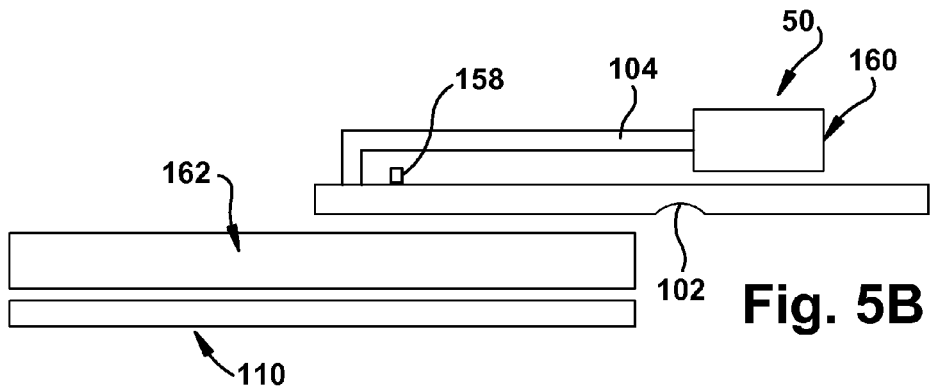
Figure 5C:
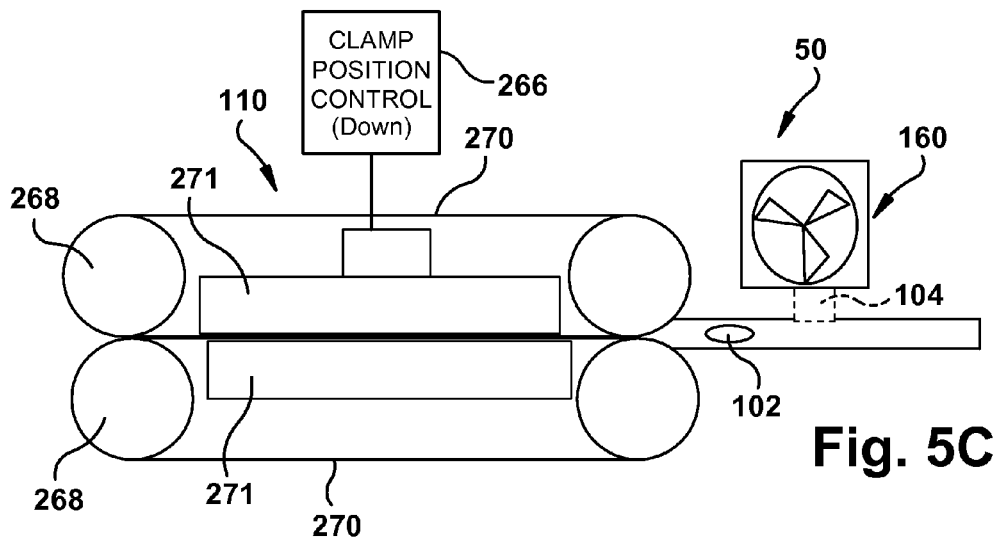
Figure 5G:
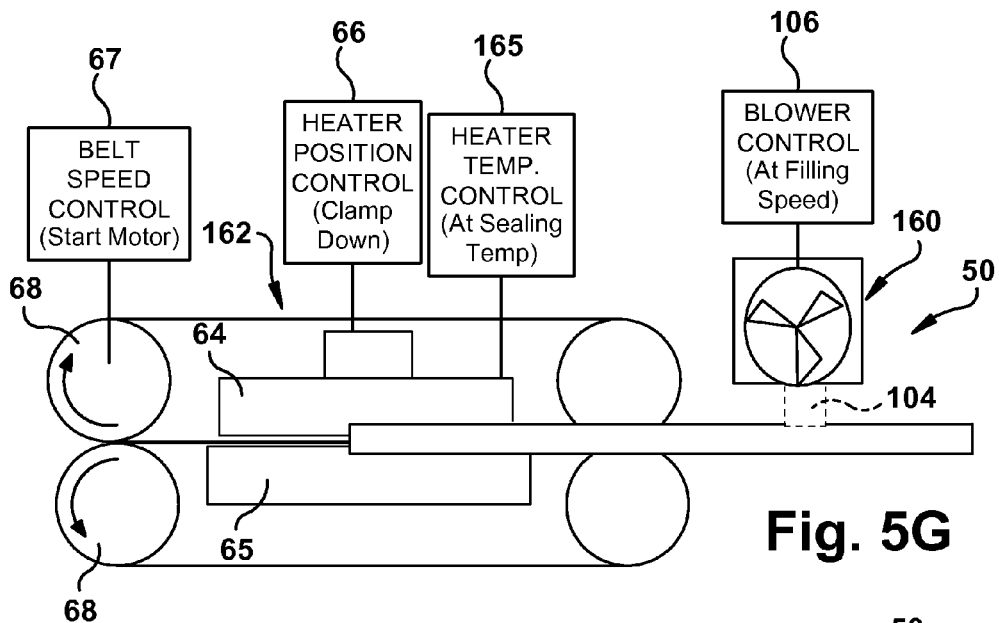
Figure 5E:
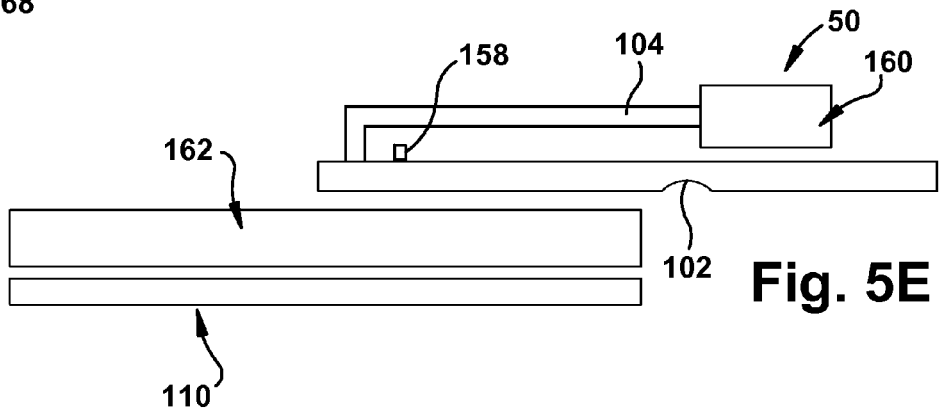
Figure 5F:
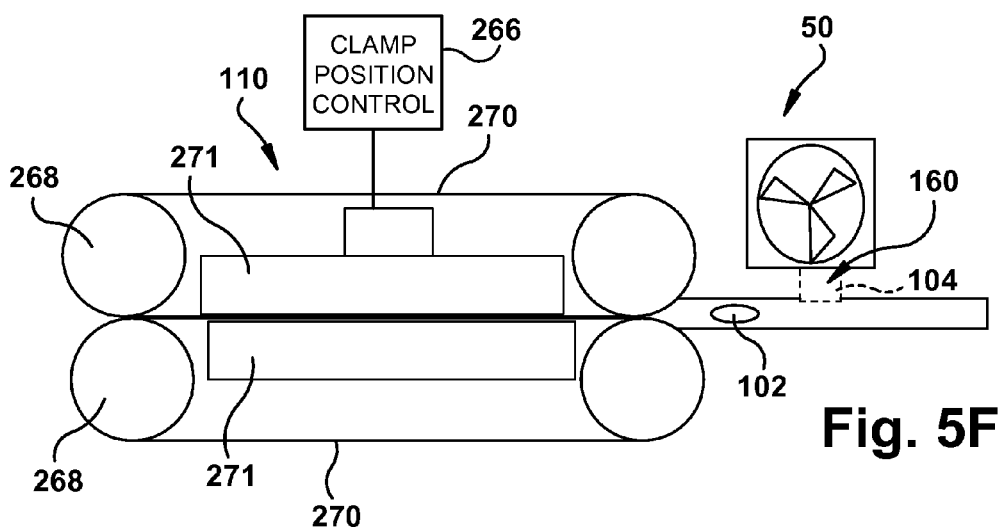

FIG. 5A illustrates the start sequence 306 and FIGS. 5B-5G illustrate the states of the components as the machine 50 executes the start sequence. When the machine 50 is turned 420 (FIG. 4A) from the idle sequence 304 to the start sequence 306, the machine 50 identifies 500 the type of material being inflated and sealed. For example, the machine may determine that that the material is a pillow type material (see for example FIG. 1) or a wrap type material (see for example U.S. Pat. Nos. D633792 and D630945). The machine may also determine the size and type of material the web 10 is made from in this step.

In the start sequence 304, the sealing elements 64 are raised from the idle temperature to a sealing temperature (when the sealing temperature is higher than the idle temperature) by the temperature control arrangement 165 at steps 502 and 504. At step 506, if the material is a wrap type material, the inflation arrangement 160 is ramped up 508 from the idle output or speed to the inflation output or speed. The ramp up from the idle output or speed to the inflation output or speed may be controlled in a variety of different ways. For example, the inflation arrangement may be ramped up until an inflation pressure set point in the web 10 is reached, until the inflation device reaches a speed set point, and/or until a predetermined period of time has elapsed after the inflation device reaches a speed set point. In the FIG. 5A example, inflation device prefills 510 the wrap type material for a predetermined period of time after the inflation device reaches the speed set point.

In the exemplary embodiment, the machine closes (See FIG. 5G) the sealing element 64 at steps 512 and 514. Pouch type material is substantially pre-inflated by operation of the inflation device 160 at idle output or speed when the sealing element 64 closes on the web. Similarly, wrap type material is substantially pre-inflated by the ramp up to the inflation output by the inflation device 160. In this manner, very little or no material is wasted upon start up of the machine, regardless of the type of material that is being used. That is, the first pouches 26 that are fed into the machine 50 are inflated and sealed, rather than being un-inflated or under-inflated.

In the exemplary embodiment, the machine determines 520 whether the inflation arrangement 160 has already been ramped to the inflation speed or output after the sealing element has closed on the web 10. For example, if the material is a pouch type material, the blower ramps 522 from the idle output to the inflation output after the sealing element 64 is closed on the web 10. Once the sealing element 64 is closed on the web 10, the belt speed control 67 starts 524 the belts 70, 270 (see arrows in FIG. 5G) and the machine begins producing sealed and inflated cushions and moves on 525 to the run sequence.

In one exemplary embodiment, control of the sealing arrangement 162, inflation arrangement 160, and/or the drive rollers 68 are interrelated. For example, the sealing arrangement 162, inflation arrangement 160, and/or the drive rollers 68 are controlled based on input from one or more of the temperature control arrangement 165, belt speed control 67 and/or the blower control 106. By interrelating the sealing arrangement 162, inflation arrangement 162, and/or the drive rollers 68, the air/pressure in the pouches and/or the quality of the inflation seal 41, may be precisely controlled.

In an exemplary embodiment, the belt speed may be controlled based on feedback from the blower control 106 and/or the temperature control arrangement 165. If the temperature of the sealing element 64 is lower than a predetermined set point, the belt speed may be reduced to ensure that enough heat is applied to the web to form a high quality seal. Similarly, if the temperature of the sealing element 64 is higher than a predetermined set point, the belt speed may be increased to ensure that too much heat is not applied to the web and thereby ensure that a high quality seal is formed. If the output or speed of the inflation arrangement 160 is lower than a predetermined set point, the belt speed may be reduced to ensure that the pouches 26 are optimally filled. In an exemplary embodiment, the blower output or speed and/or the heating element temperature 64 are continuously controlled to bring the blower output or speed and the heating element temperature to predetermined setpoints. The speed of the belts may be continuously updated based on the feedback from the blower control 106 and/or the temperature control arrangement 165 to optimize the seal quality and pouch filling, especially as the inflation arrangement and/or the sealing element are being ramped to their normal operating conditions.

In an exemplary embodiment, the temperature of the sealing element 64 may be controlled based on feedback from the inflation control 106 and/or the belt speed control 67. If the belt speed is lower than a predetermined set point, the temperature of the sealing element 64 may be reduced to ensure that too much heat is not applied to the web and ensure that a high quality seal is formed. Similarly, if the belt speed is higher than a predetermined set point, the temperature of the sealing element 64 may be increased to ensure that enough heat is applied to the web and a high quality seal is formed. In an exemplary embodiment, the blower output or speed and/or the belt speed control 67 are continuously controlled to bring the blower output or speed and the belt speed to predetermined setpoints. The temperature of the sealing element 64 may be continuously updated based on the feedback from the blower control 106 and/or the belt speed to optimize the seal quality and pouch filling, especially as the inflation arrangement and/or the belt speed are being ramped to their normal operating conditions.

In an exemplary embodiment, the inflation arrangement 160 may be controlled based on feedback from the belt speed control 67 and/or the temperature control arrangement 165. If the temperature of the sealing element 64 is lower than a predetermined set point, the blower output or speed may be changed to ensure proper inflation and sealing of the air filled cushions. If the belt speed is lower than a predetermined set point, the blower output or speed may be changed to ensure proper inflation and sealing of the air filled cushions. In an exemplary embodiment, the belt speed and/or the heating element temperature are continuously controlled to bring the belt speed and/or the heating element temperature to predetermined setpoints. The blower speed or output may be continuously updated based on the feedback from the drive roller control 67 and/or the temperature control arrangement 165 to optimize the seal quality and pouch filling, especially as the belt speed and/or the sealing temperature are being ramped to their normal operating conditions.

In one exemplary embodiment, the temperature of the sealing arrangement 162 is independent of feedback from inflation control and belt control. In this embodiment, belt speed may be controlled based solely on feedback from the sealing arrangement 162. Similarly, in this embodiment, the inflation arrangement 162 may be controlled based solely on feedback from the sealing arrangement 162. In an exemplary embodiment, the machine 50 is programmed with a control loop that brings the sealing arrangement to 162 to a temperature setpoint and to hold the temperature at the setpoint. During execution of this control loop, the current temperature of the sealing arrangement is monitored and is used to control the belt speed and inflation arrangement 162.

Figure 6:
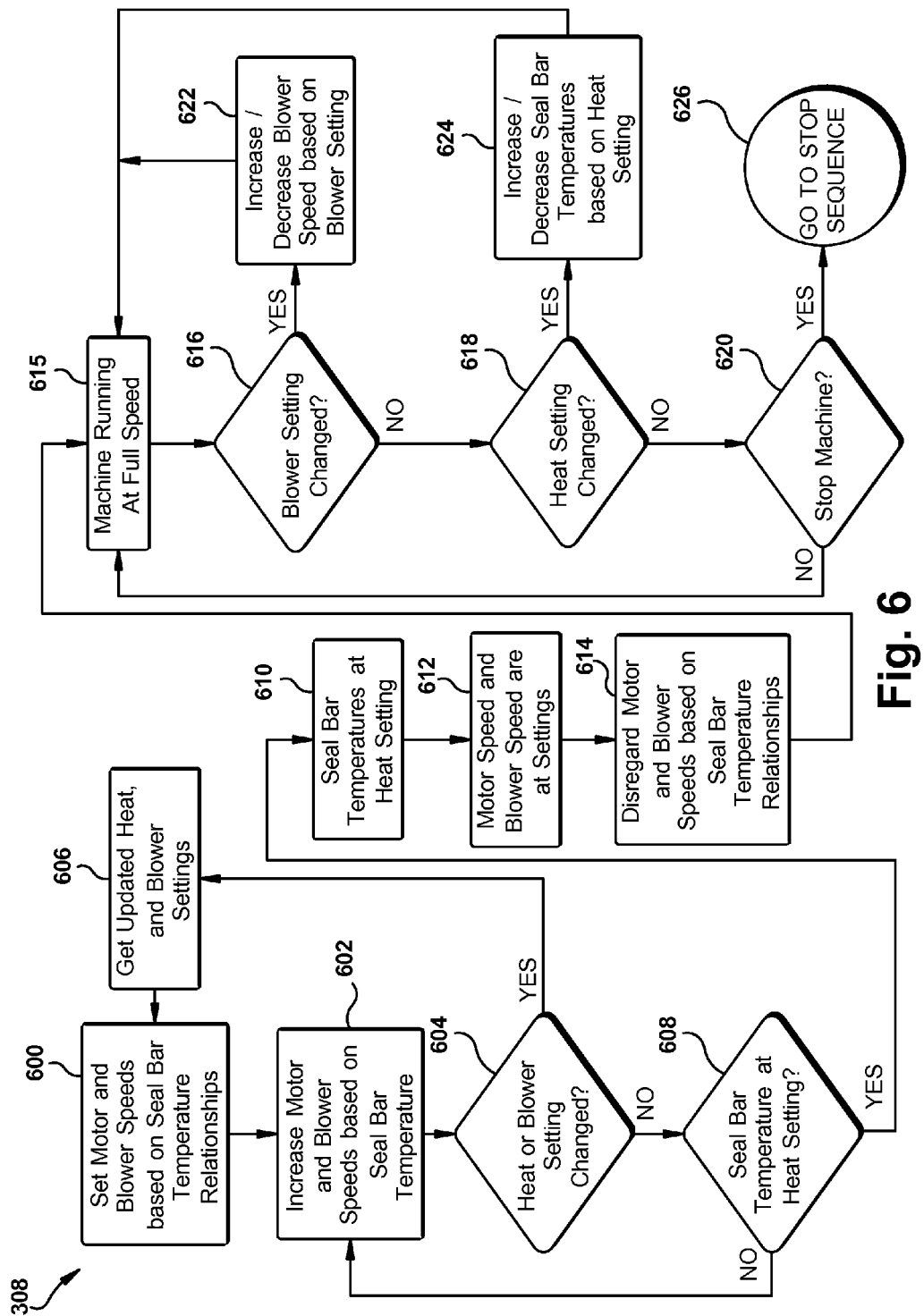
FIG. 6 is a flow chart illustrating an exemplary embodiment of a run sequence of a control algorithm for an air cushion inflation machine.

FIG. 6 illustrates an exemplary embodiment of a run sequence 308 where control of the sealing arrangement 162, inflation arrangement 160, and/or the drive rollers 68 are interrelated. It should be appreciated that the control of the sealing arrangement 162, inflation arrangement 160, and/or the drive rollers 68 can be interrelated in a wide variety of different ways and that FIG. 6 illustrates one of the many possibilities. In FIG. 6, relationships of the belt speed and inflation device speed or output with respect to the temperature of the heating device are set 600. The belt speed and inflation device speed or output are set 602 based on the current temperature of the sealing element 64. At optional step 604, if the set point of the sealing element 64 and/or the set point of the inflation arrangement 160 have changed (for example, due to user input), the updated setpoints are retrieved 606 and the relationships of the belt speed and inflation device speed or output with respect to the temperature of the heating device are reset 600. If the set point of the sealing element 64 and/or the set point of the inflation arrangement 160 have not changed, the sequence checks 608 to see if the sealing element 64 has reached the temperature set point. If the sealing element 64 has not reached the temperature set point, the belt speed and inflation device speed or output are updated 602 based on the current temperature of the sealing element 64. This process is repeated until the sealing element 64 reaches the temperature set point.

Once the sealing element 64 is at the temperature setting 610 and the belt speed and inflation device output are at the corresponding setpoints 612, the relationships between the belt speed and inflation device speed or output with respect to the temperature of the heating device may optionally be disregarded 614 until the machine is stopped or for a predetermined period of time or until an event is detected that triggers updating of the belt speed and/or inflation device output. At this point, the machine 50 is running at a full or optimal speed 615 and continues to do so until an inflation setting changes 616, a heat setting changes 618, or the machine is stopped 620. When an inflation device setting changes, the inflation device speed or output is increased or decreased 622 based on the new setting. When a temperature setting changes, the heating device temperature set point is increased or decreased 624 based on the new setting. When the machine is stopped, the sequence proceeds 626 to the stop sequence 310.

Figure 7A:
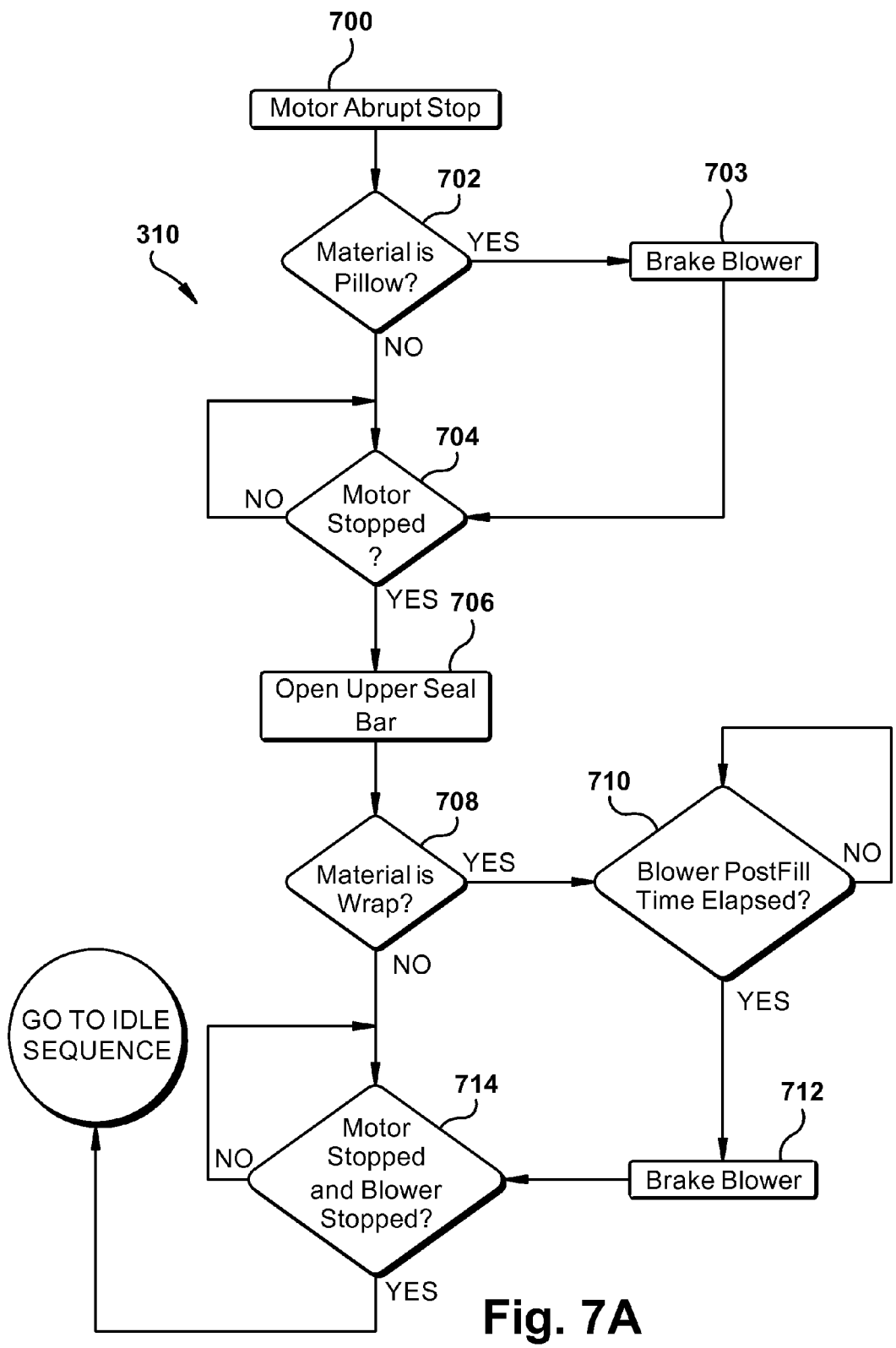
FIG. 7A is a flow chart illustrating an exemplary embodiment of a stop sequence of a control algorithm for an air cushion inflation machine.
Figure 7D:
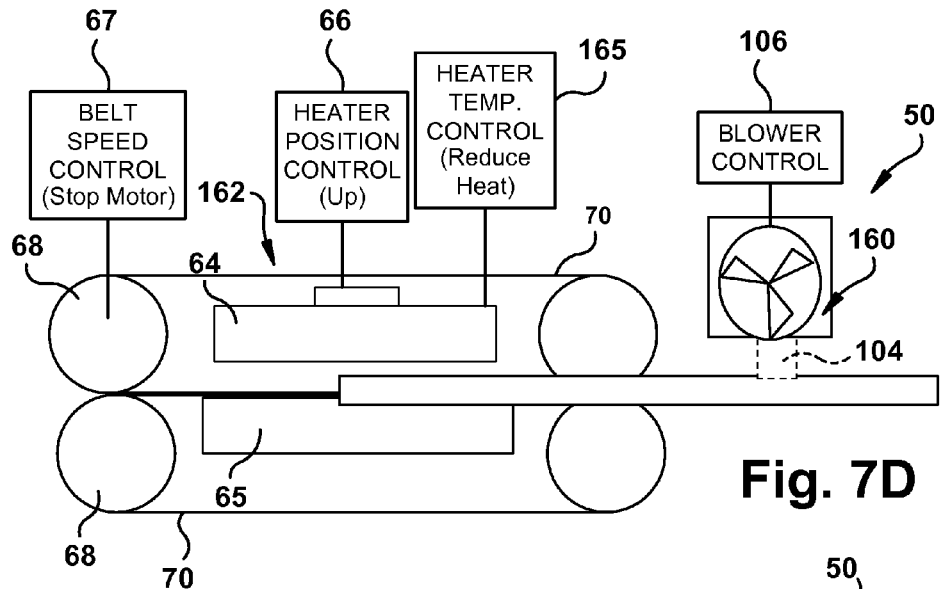
FIGS. 7B-7D illustrate an example of states of components of an air cushion inflation machine when the air cushion inflation machine is in a stop condition.
Figure 7B:
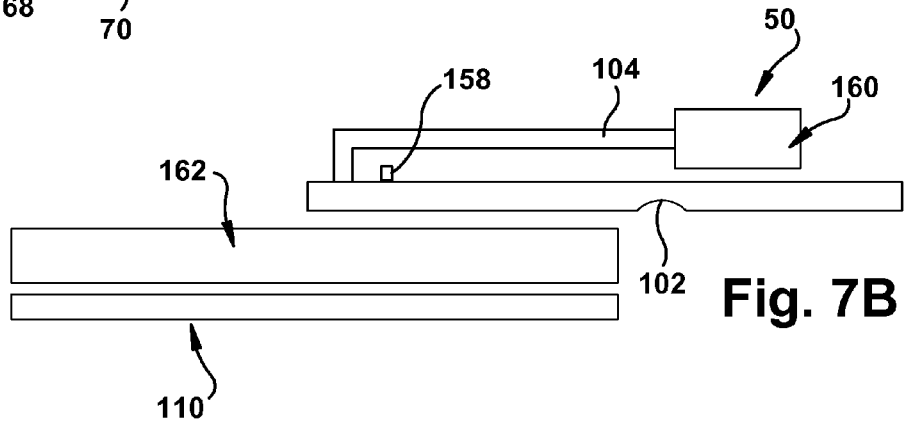
Figure 7C:
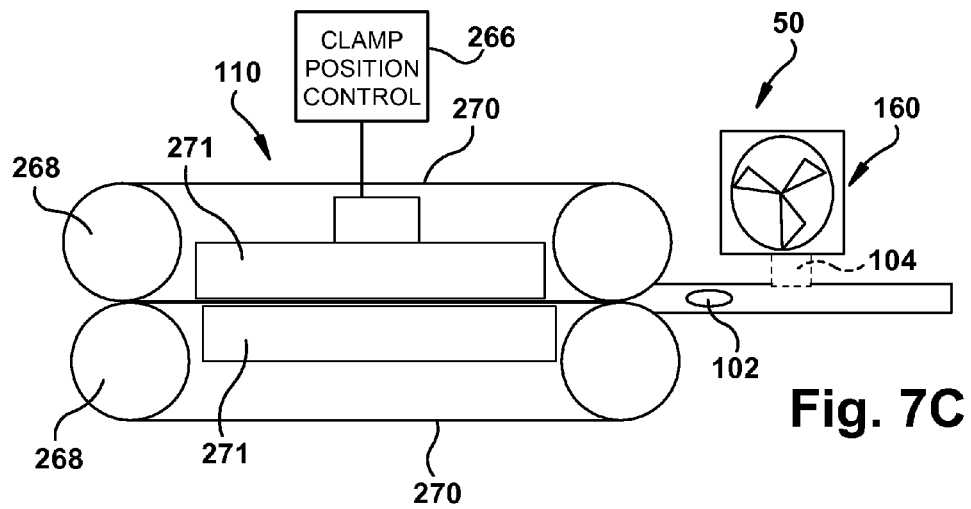

FIG. 7A illustrates and exemplary stop sequence and FIGS. 7B-7D illustrate examples of conditions of components of the machine 50 during the stop sequence. In the stop sequence 310, the belt speed control 67 stops 700 the belts 70, 270 (FIG. 7D). At optional step 702, if the material is pillow type material, the inflation arrangement 160 is braked 703. At step 704, the sequence confirms that the belts 70, 270 have been stopped. Once the belts 70, 270 are stopped, the machine opens 706 the sealing element 64. At optional step 708, if the material is wrap type material, the sequence allows 710 a predetermined period of time to elapse and then the inflation arrangement 160 is braked 712. At step 714, the sequence confirms 716 that both the belts 70, 270 and the inflation arrangement 160 are stopped and the sequence returns to the idle sequence 304 or the stop state 302.

Figure 8:
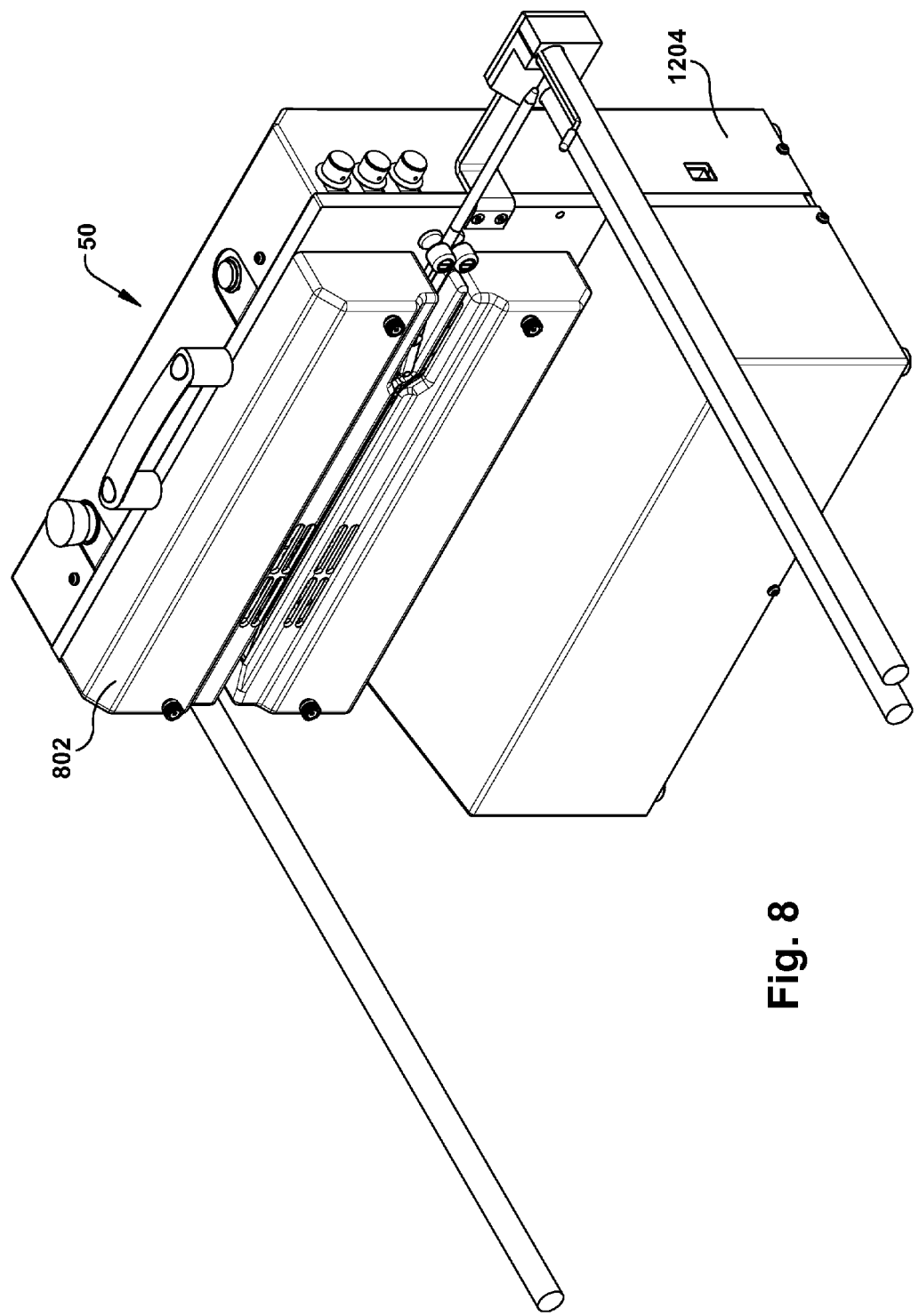
FIG. 8 is a perspective view of an exemplary embodiment of an air cushion inflation machine.
Figure 9:
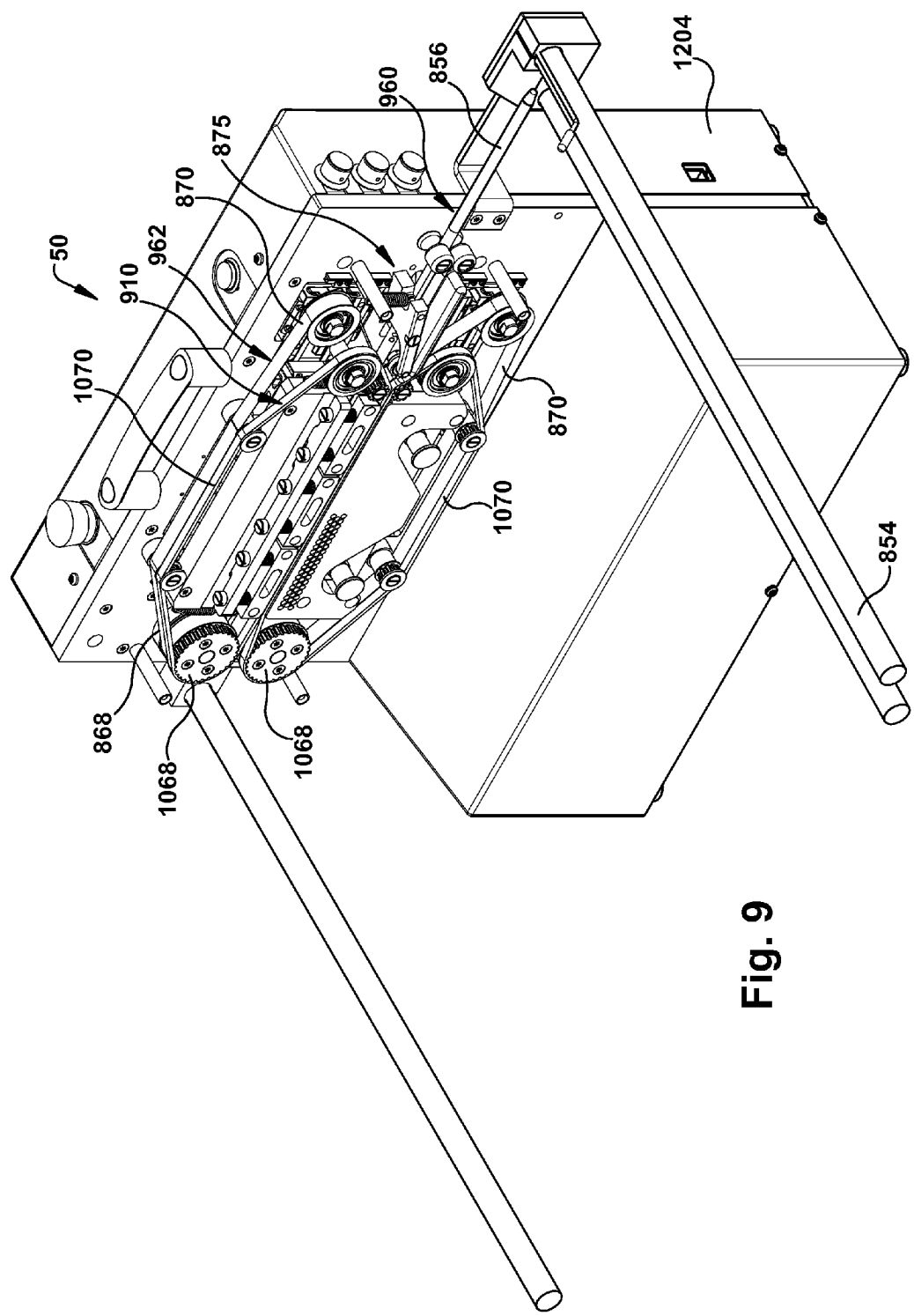
FIG. 9 is a perspective view of the air cushion inflation machine of FIG. 8 with cover components removed.
Figure 10:
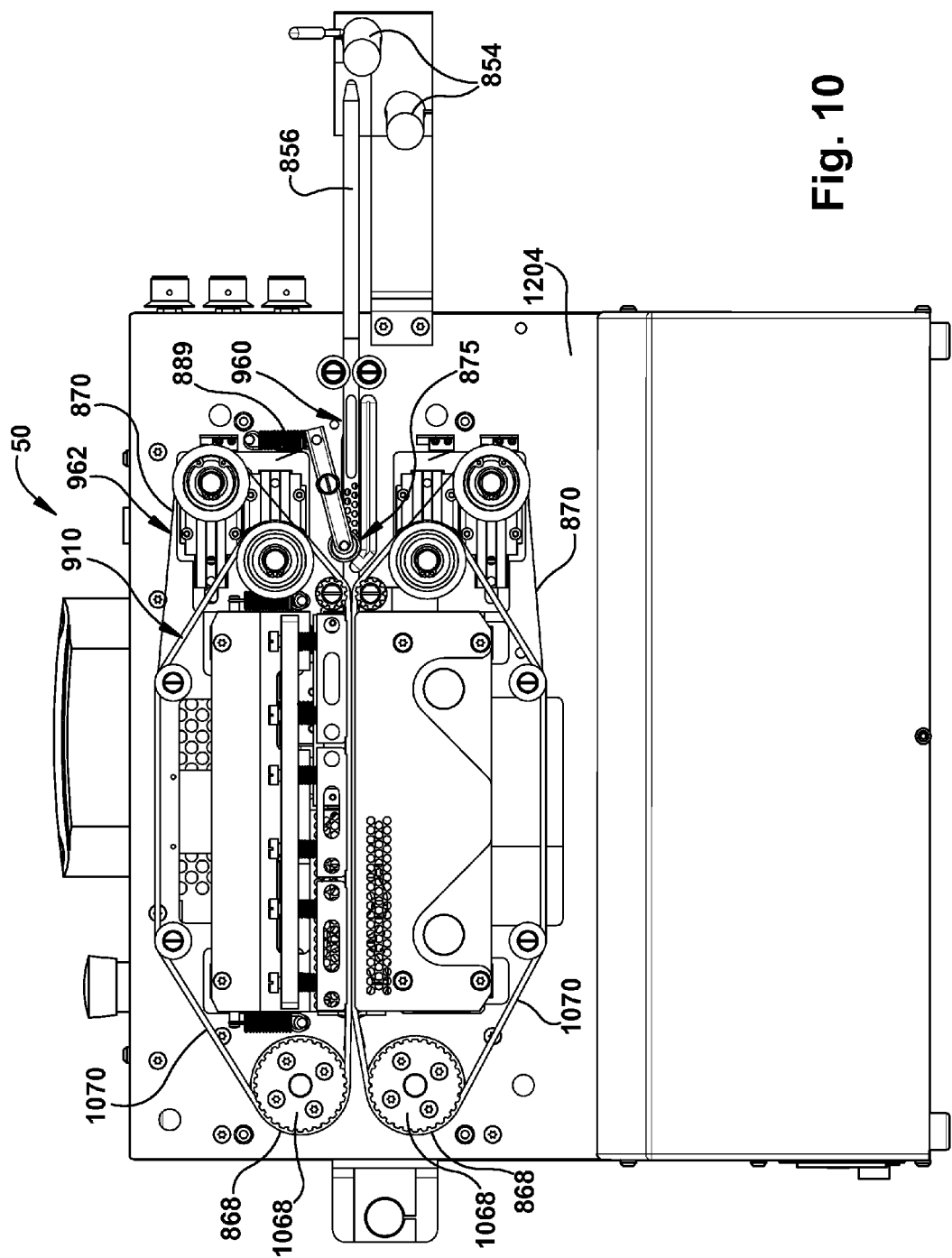
FIG. 10 is a front view of the air cushion inflation machine shown in FIG. 9.
Figure 11:
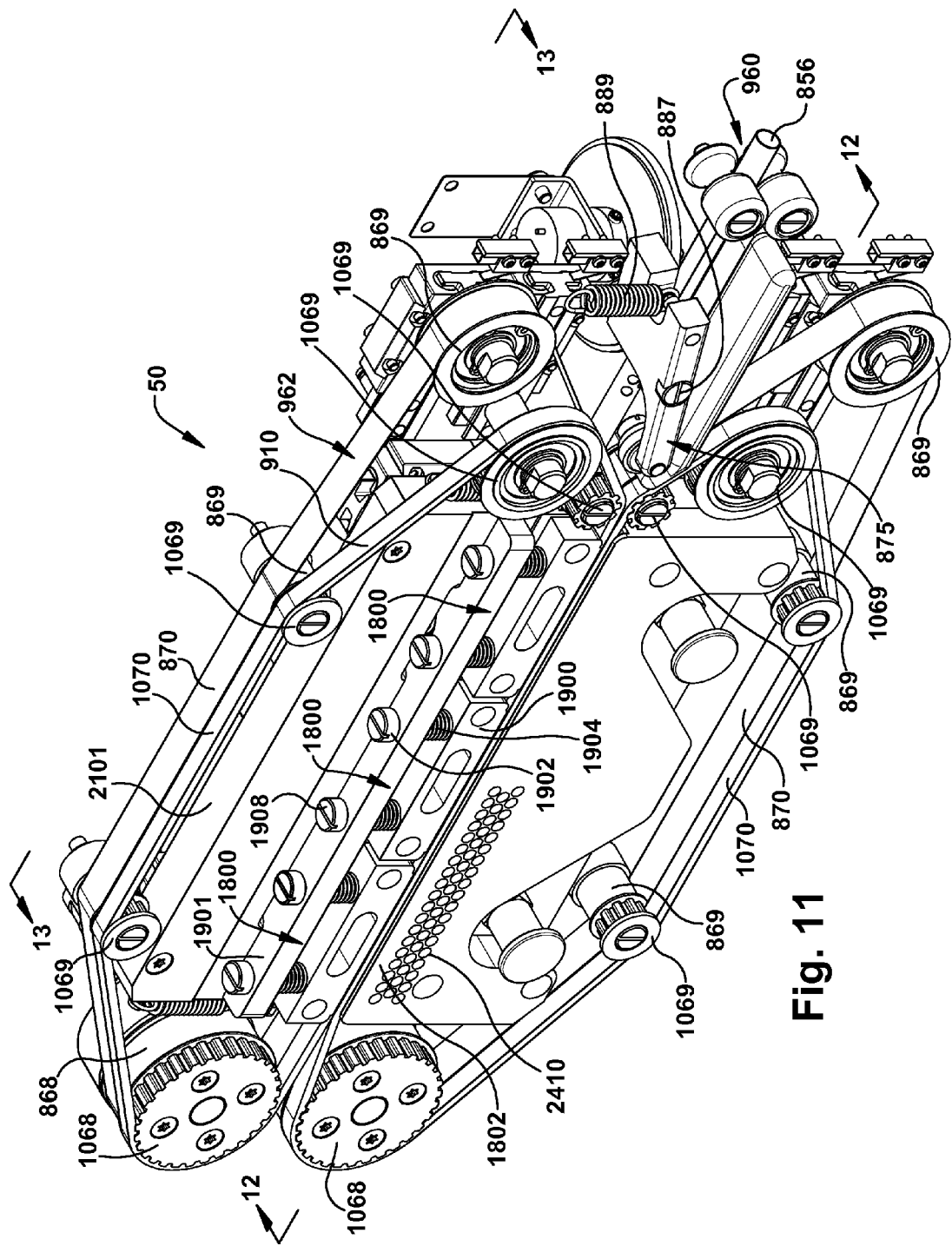
FIG. 11 is a perspective view of the sealing and clamp assemblies of the air cushion inflation machine shown in FIG. 9.

The machine 50 may take a wide variety of different forms. FIGS. 8-25 illustrate one, non-limiting, exemplary embodiment of the machine 50 in detail. In the example illustrated by FIGS. 8-25, the machine 50 includes an inflation arrangement 960 (see FIGS. 12 and 13), a sealing arrangement 962 (see FIG. 15), a clamping arrangement 910 (see FIG. 18), a web separation device 958 (see FIG. 13), and a web tensioning device 875 (see FIG. 12). FIG. 8 illustrates the machine 50 with a cover 802 disposed over the sealing arrangement 962 and the clamping arrangement 910. FIGS. 8-10 illustrate the machine 50 with the cover removed.

Referring to FIGS. 8-10, the web 10 is routed from a supply to and around a pair of elongated, transversely extending guide rollers 854. The web 10 is then routed to a longitudinally extending guide pin 856. The guide pin 856 is disposed between the inflation edge 20 and the transverse seals 22 of the web 10. The guide pin 856 aligns the web as it is pulled through the machine. The web 10 is routed along the guide pin 856 through the web tensioning device 875.

Figure 12:
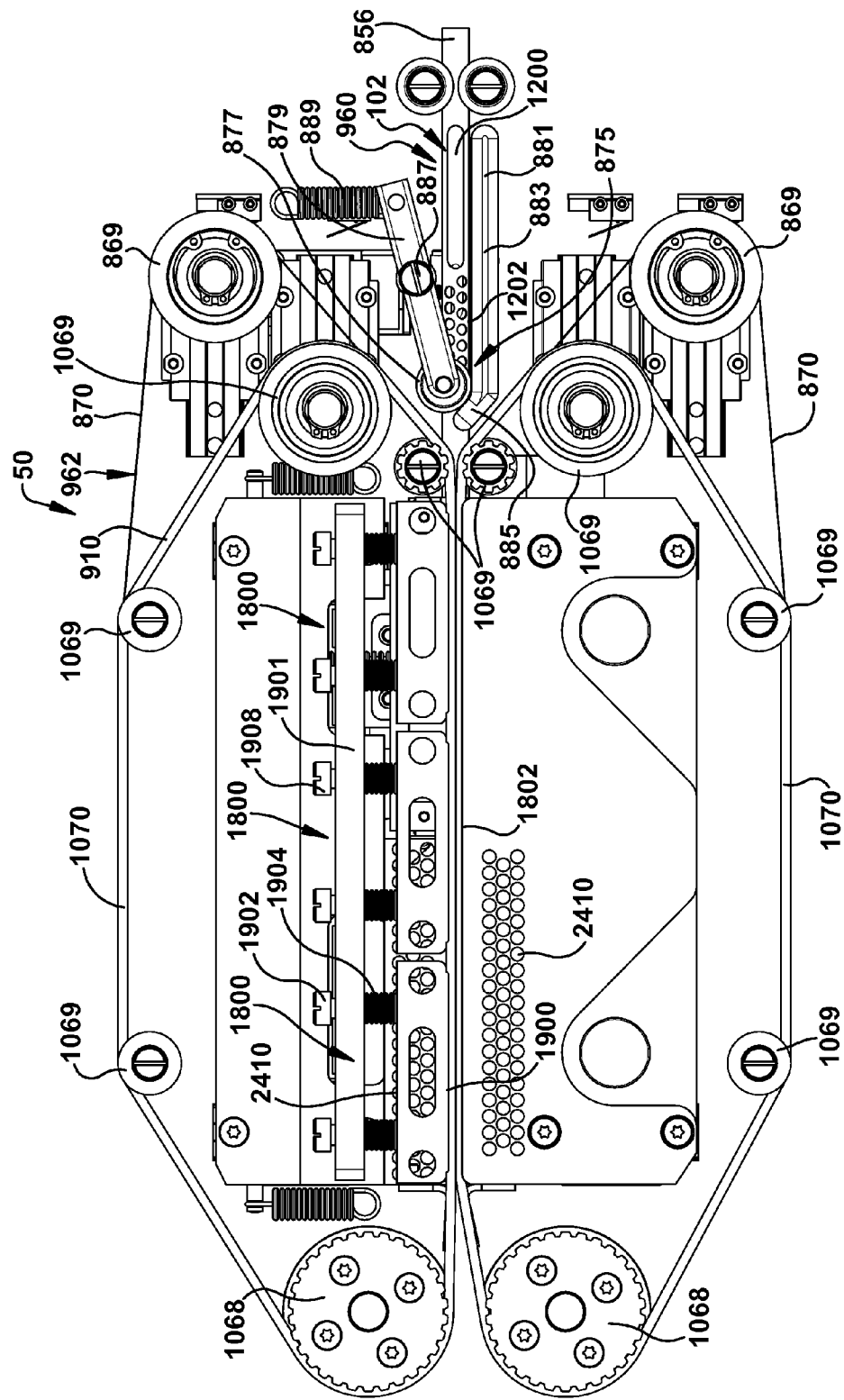
FIG. 12 is a view taken as indicated by lines 12-12 in FIG. 11.
Figure 12A:
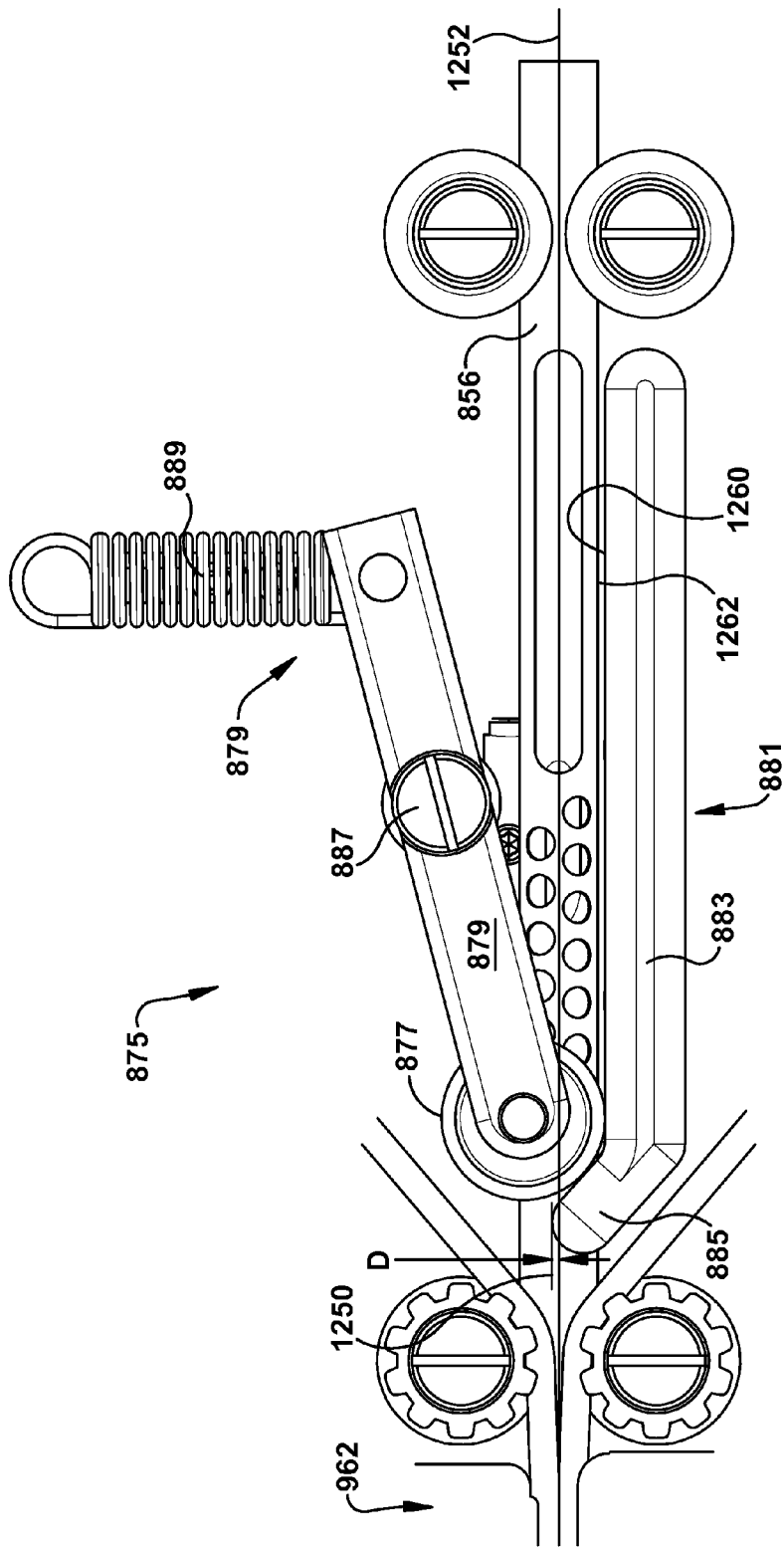
FIG. 12A is an enlarged portion of FIG. 12.
Figure 12B:
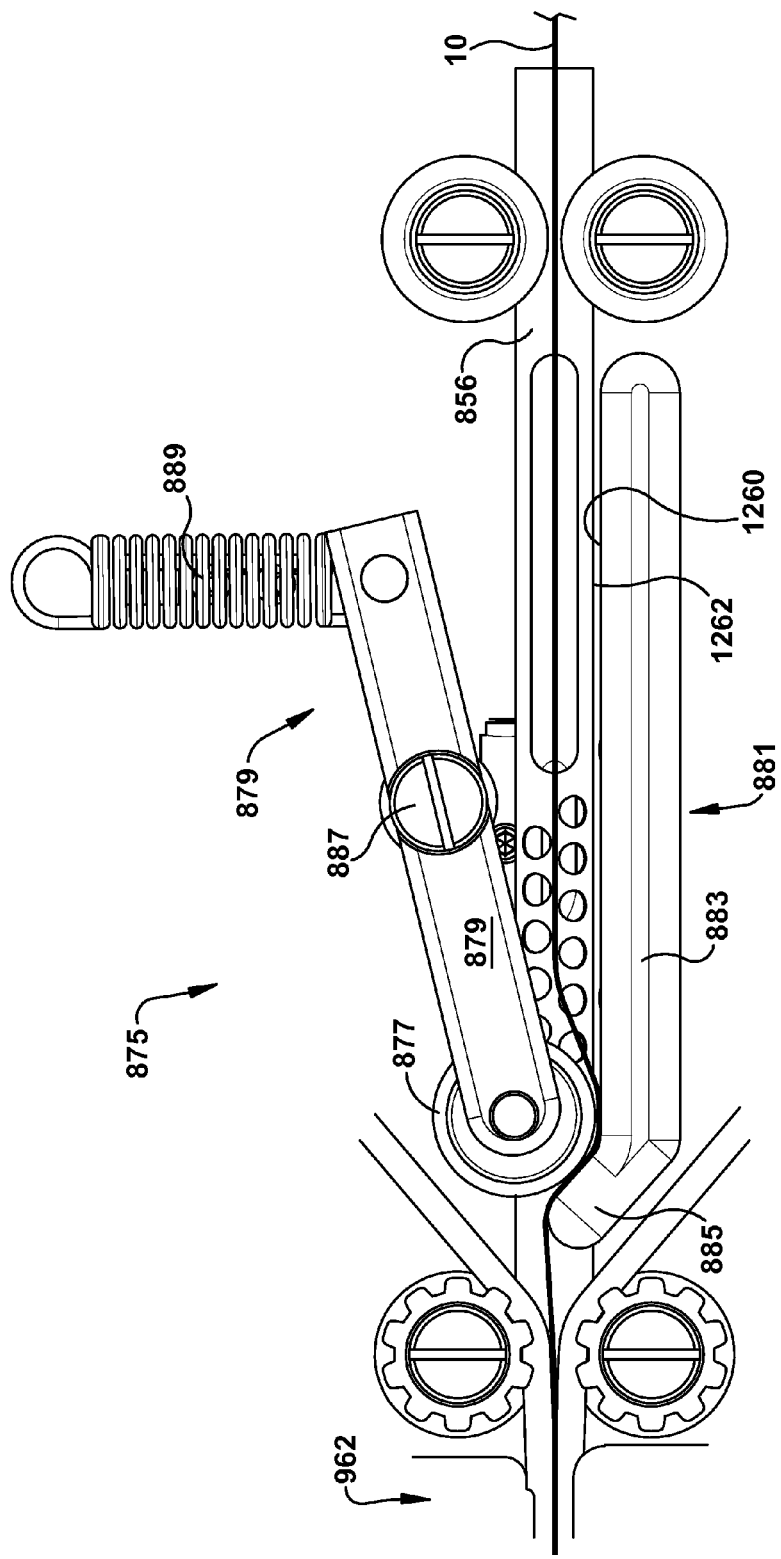
FIG. 12B is a view similar to FIG. 12A illustrating routing of inflation cushion material into the machine.

The tensioning device 875 keeps the web 10 (see FIG. 12B) taught as the web is pulled through the machine 50 (see FIG. 12). Keeping the web taught taut in the sealing arrangement 962 prevents wrinkles from forming in the seal 23. The tensioning device can take a wide variety of different forms. Any arrangement that applies tension to the web 10 can be used. Referring to FIGS. 12A and 12B, in the illustrated embodiment the tensioning device 875 includes a roller 877, a spring loaded pivot arm 879, and a shelf member 881. The shelf member 881 is fixed with respect to the path of travel of the web 10. The illustrated shelf member 881 includes a substantially horizontal portion 883 and an upwardly extending portion 885 that extends upward at an obtuse angle from the substantially horizontal portion 883.

The substantially horizontal portion 883 and the upwardly extending portion 885 can take a variety of different forms. In FIG. 12A, a centerline 1252 (the midpoint between the top and the bottom) of the guide pin 856 is depicted. In an exemplary embodiment, an upper surface 1260 of the substantially horizontal portion 883 is lower than the centerline 1252. In the example illustrated by FIG. 12A, an upper surface 1260 of the substantially horizontal portion 883 is lower than a bottom 1262 of the guide pin 856. In FIG. 12A, a horizontal line 1250 that is tangent to the top or uppermost surface of the upwardly extending portion 885 is depicted. In an exemplary embodiment, the top or uppermost surface 1250 is positioned to keep the pocket 23 taught against the guide pin 856, but not so taught that the perforations of the pocket 23 break. By pulling the pocket 23 of the web 10 taught against the guide pin 856, wrinkles in the web are eliminated as the web passes through the sealing arrangement 162. In one exemplary embodiment, the uppermost surface 1250 is positioned at or above the centerline 1252 of the guide pin 856. For example, the uppermost surface 1250 may be positioned at a distance D above the centerline. The distance D may be less than or equal to 0.250 inches, less than or equal to 0.218 inches, less than or equal to 0.187 inches, less than or equal to 0.156 inches, less than or equal to 0.125 inches, less than or equal to 0.093 inches, less than or equal to 0.062 inches, or less than or equal to 0.031 inches.

Referring to FIG. 12B, the pivot arm 879 is pivotally mounted to the machine 50 at a pivot 887. A spring 889 is attached to a first end of the pivot arm and to the machine 50. The roller 877 is rotatably attached to the second end of the pivot arm 879. The spring 889 forces the roller 877 against the shelf member 881 at the intersection of the substantially horizontal portion 883 and the upwardly extending portion 885. It should be readily apparent that the roller 877, the pivot arm 879 and/or the spring 889 can be replaced with any arrangement that frictionally engages the web. The frictional force is selected to keep the web 10 taught as the web passes through the sealing arrangement 162, but the frictional force is not great enough to cause the web 10 to tear. In one exemplary embodiment, the force applied between the roller 877 and the shelf 881 is between 5 lbs and 10 lbs, such as about 7 lbs or 7 lbs. The width of the contact area between the roller 877 and the shelf member 881 also influences the frictional force applied to the web 10. In one exemplary embodiment, the width of the contact area between the roller 877 and the shelf member 881 is between 0.062 and 0.375 inches, between 0.093 and 0.250 inches, between 0.125 and 0.187 inches, about 0.140 inches, or 0.140 inches.

Referring to FIG. 12B, the web 10 is routed between the roller 877 and the shelf member 881 such that the roller and the shelf member frictionally engage the layers 14, 16 of the web 10. The web 10 passes under the roller 877, up and over the upwardly extending portion 885 of the shelf member, and then into the sealing arrangement 962. The friction between the web 10, the roller 877, and the shelf member 881 keeps the taut as the web is pulled through the sealing arrangement 962.

Figure 13:
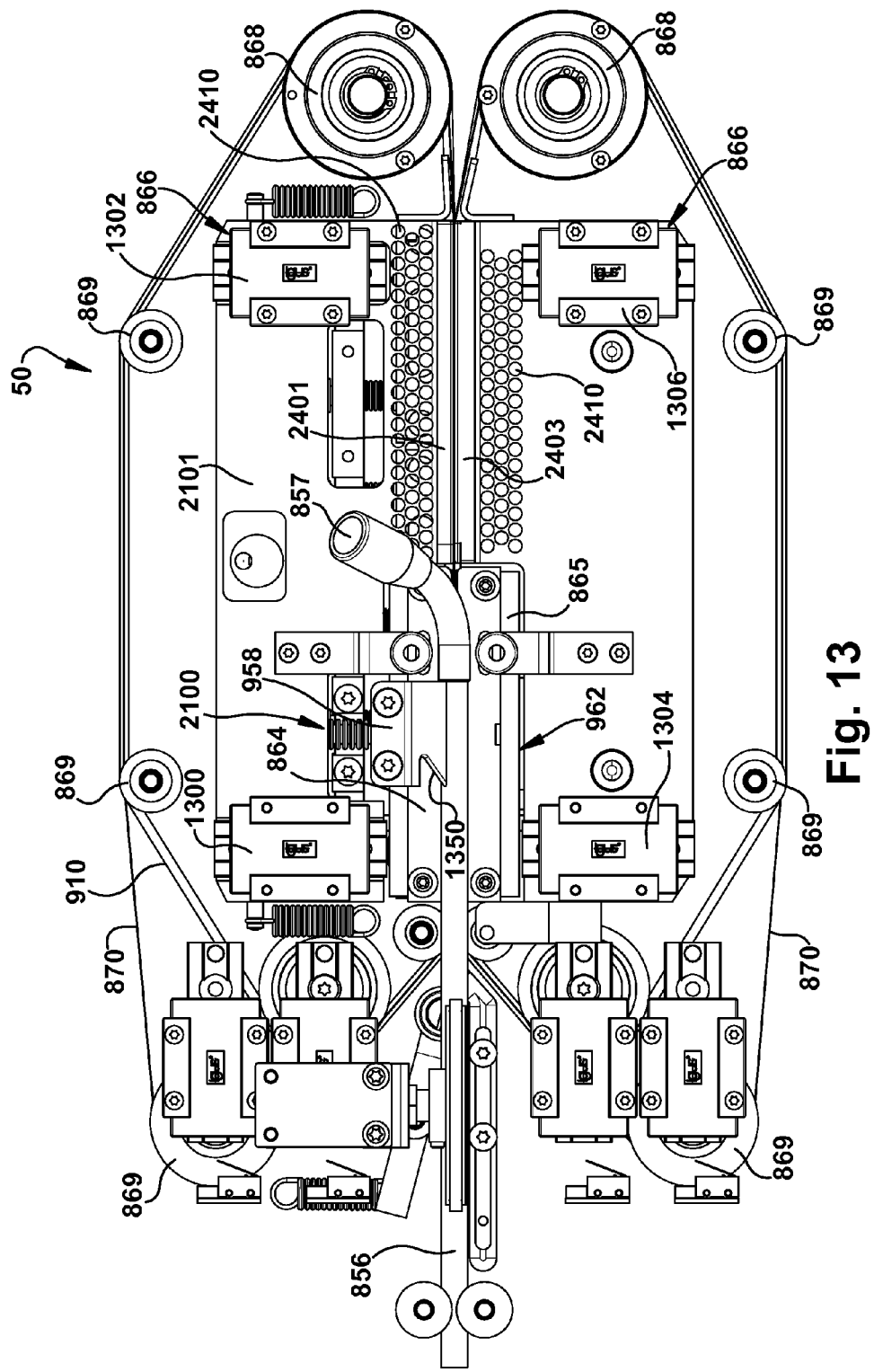
FIG. 13 is a view taken as indicated by lines 13-13 in FIG. 11.

The inflation arrangement 960 can take a wide variety of different forms. Referring to FIGS. 12 and 13, in the illustrated embodiment, the inflation arrangement 960 includes the hollow, longitudinally extending guide pin 856 and an inlet opening 857 for fluid connection to a blower or other source of air under pressure or other fluid under pressure. The illustrated guide pin 856 includes a plurality of inflation openings 102 (See FIG. 12). The inflation openings 102 can take a wide variety of different forms. In the illustrated embodiment, the guide pin 856 includes a first, relatively large, opening 1200 and a plurality of smaller openings 1202. The illustrated opening 1200 is a slot with semi-circular ends. The illustrated smaller openings 1202 are circular in shape. The blower and blower control are disposed in a housing 1204 (FIGS. 8-10) of the machine 50.

Figure 15:
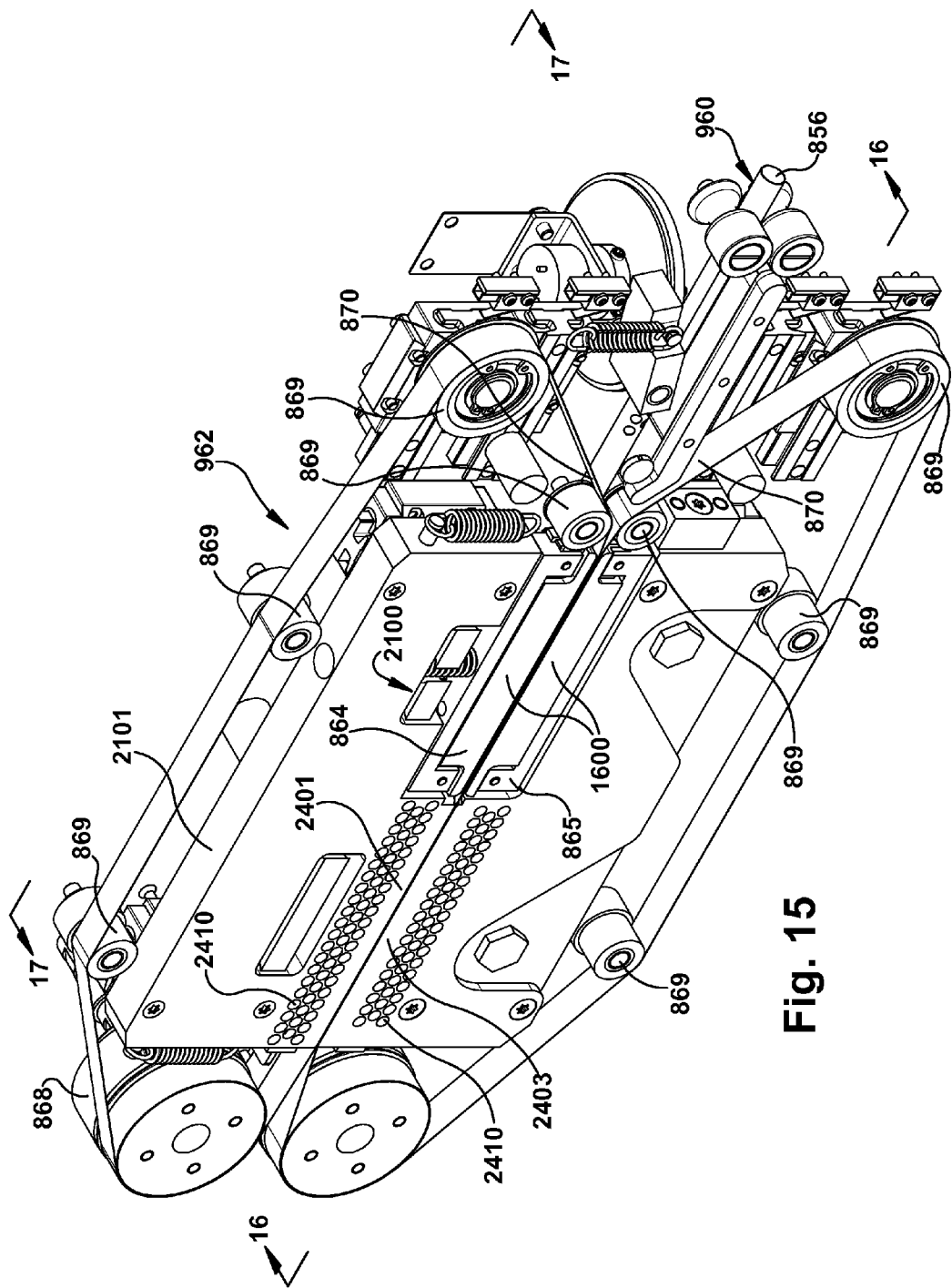
FIG. 15 is a perspective view of a sealing assembly of the air cushion inflation machine shown in FIG. 9.
Figure 16:
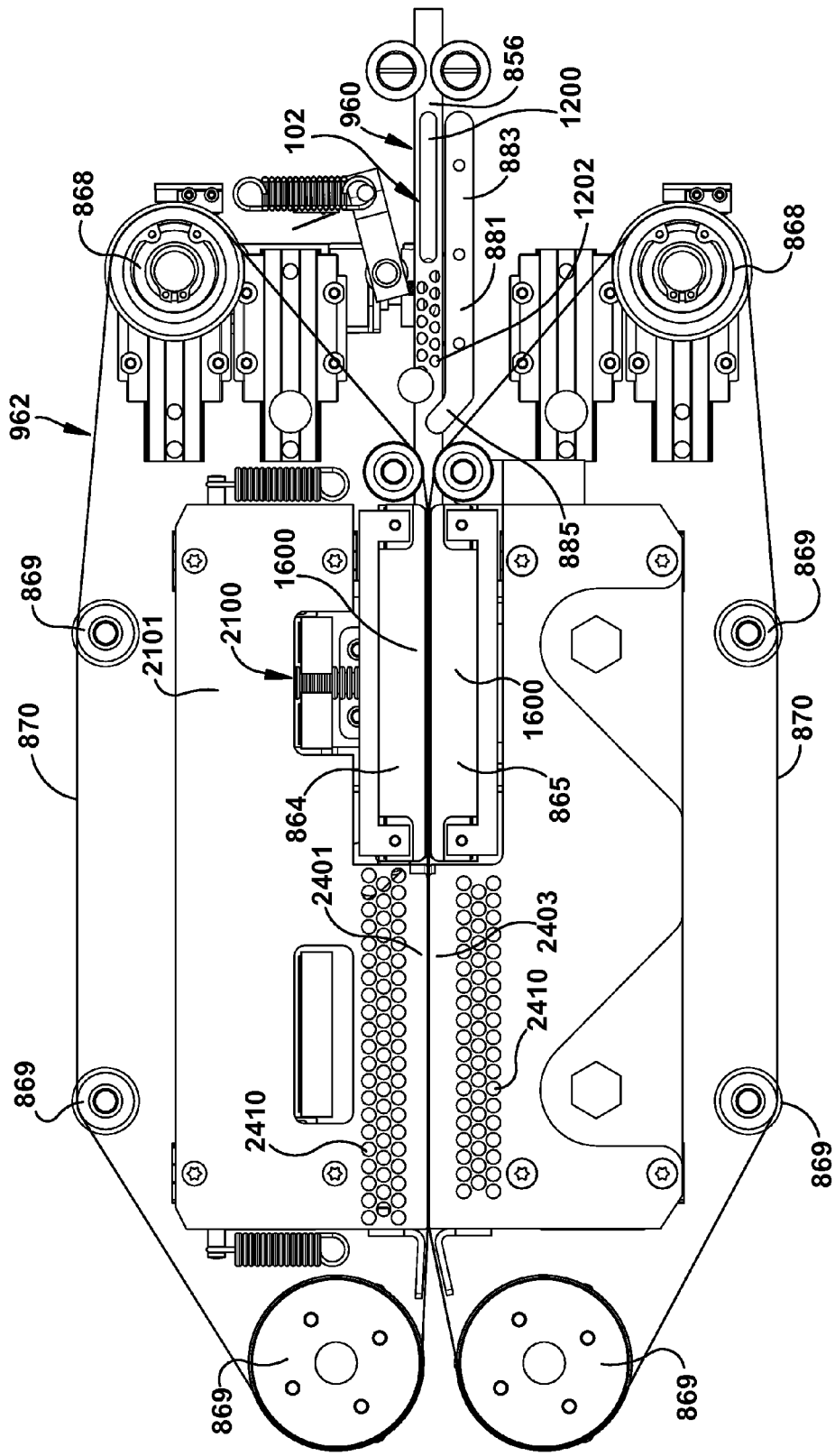
FIG. 16 is a view taken as indicated by lines 16-16 in FIG. 15.
Figure 17:
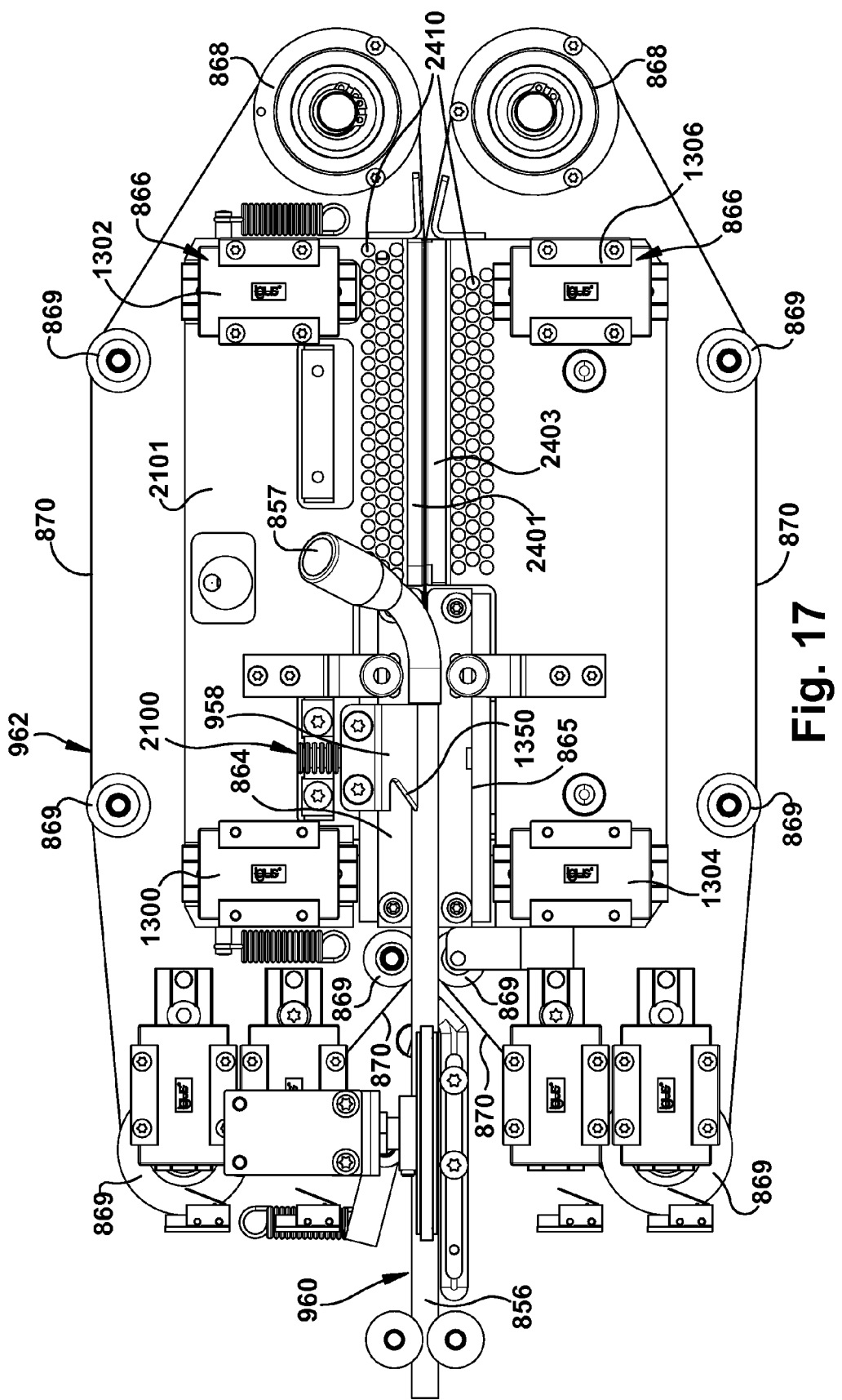
FIG. 17 is a view taken as indicated by lines 17-17 in FIG. 15.

The sealing arrangement 962 forms the seal 42 to create sealed inflated cushions 12. The sealing arrangement 962 can take a wide variety of different forms. Referring to FIGS. 15-17, the sealing assembly 962 includes heated sealing elements 864, 865, a heat sealing element positioning device 866, drive rollers 868, idler rollers 869, and sealing belts 870. Each belt 870 is disposed around its respective heat sealing elements 864, 865, drive roller 868, and idler rollers 869.

Each belt 870 is driven by its respective drive roller 868. In an exemplary embodiment, the speed of the drive rollers 868 and belts 870 are controlled by a belt speed control that is disposed in the housing 1204 of the machine. The belt speed control may be part of an overall controller for the machine or the belt speed controller may be a separate device that interfaces with other devices. The belts 870 engage one another, such that the belts 870 pull the web 10 through the heat sealing elements 864, 865. The seal 42 is formed as the web 10 passes through the heated sealing elements 864, 865.

Figure 21:
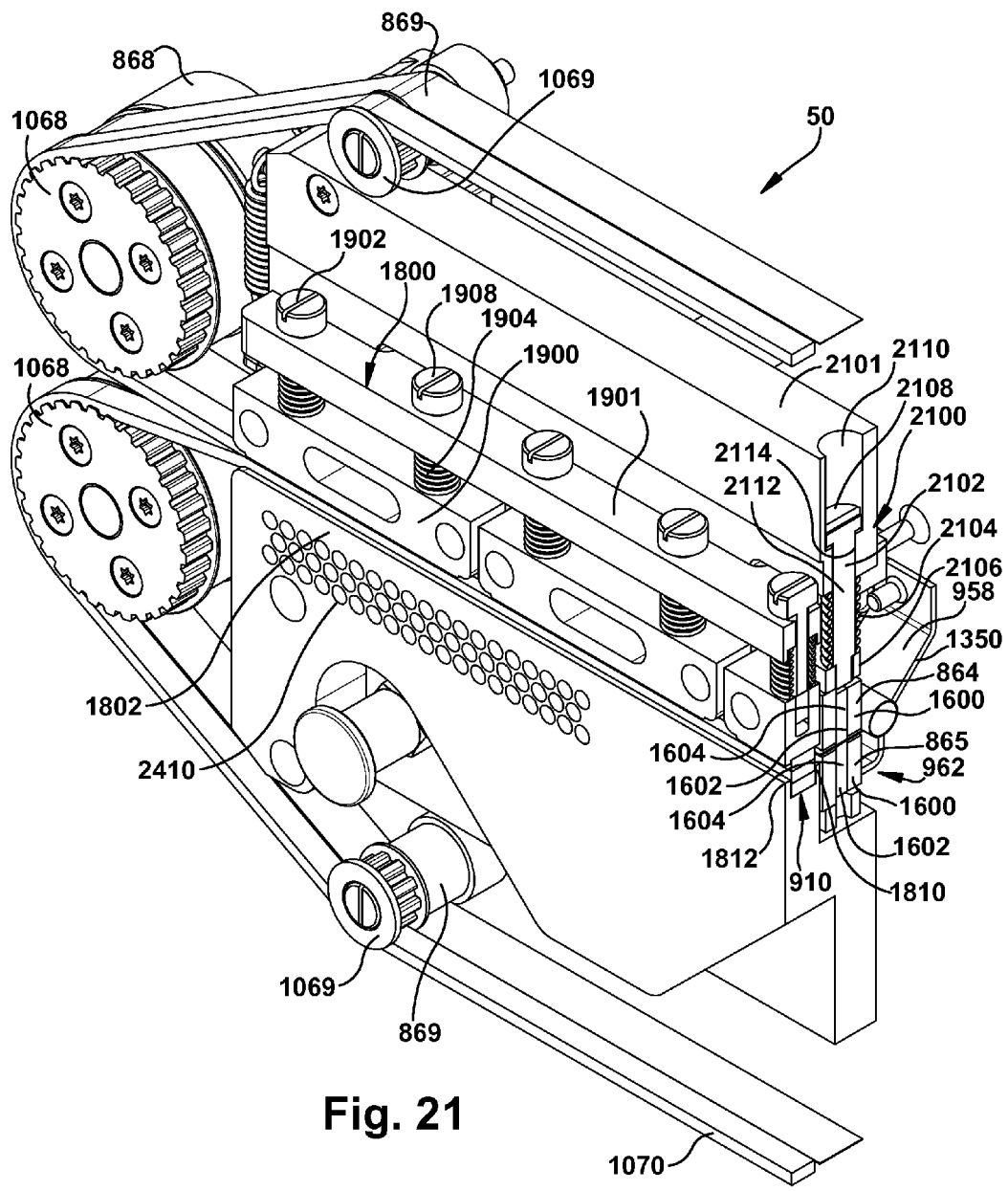
FIG. 21 is a sectioned perspective view with the section being taken as indicated by lines 21-21 in FIG. 20.
Figure 22:
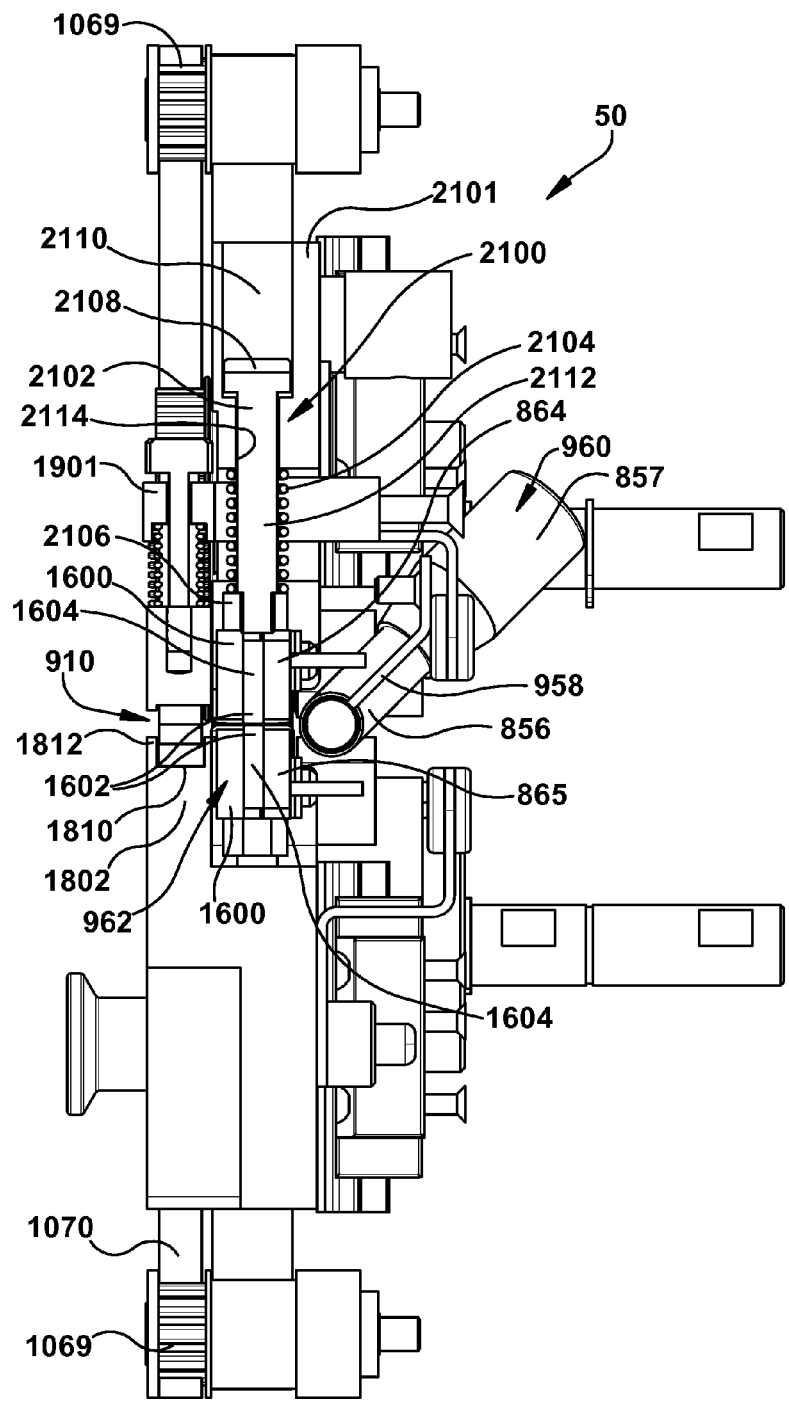
FIG. 22 is a sectional view taken along the plane indicated by lines 21-21 in FIG. 20.
Figure 23:
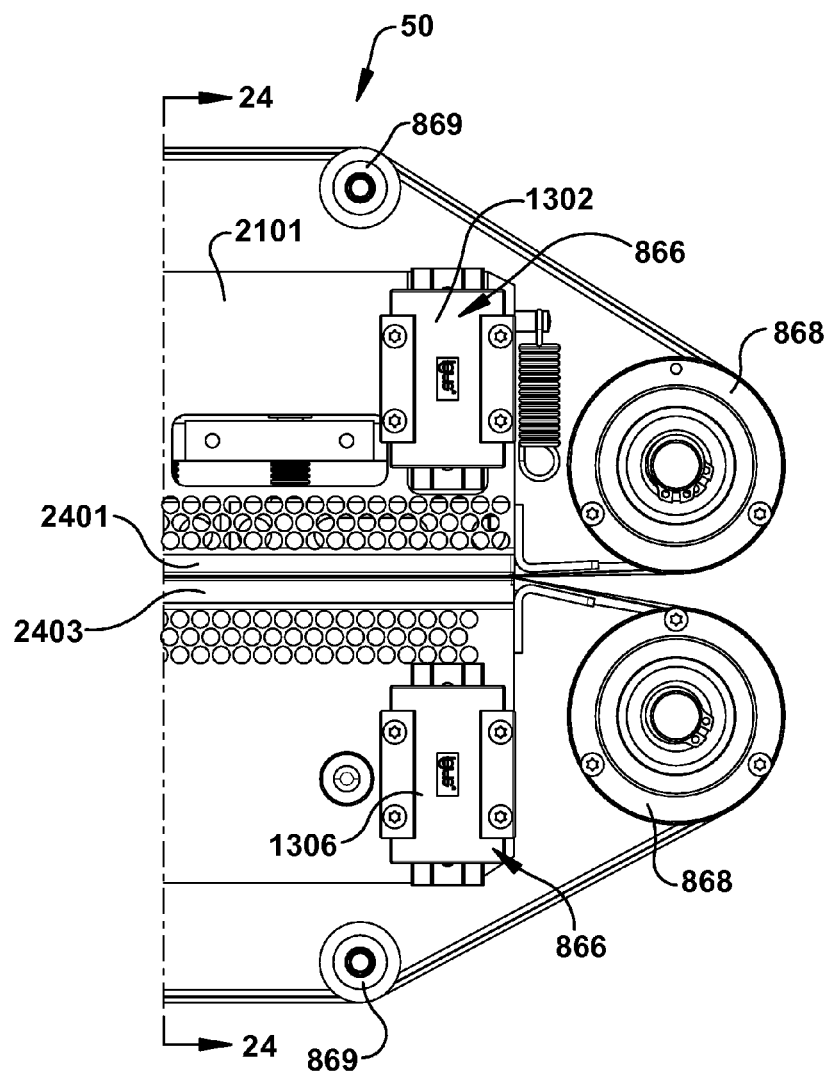
FIG. 23 is a partial rear view of the sealing and clamping assemblies shown in FIG. 11.

Referring to FIG. 21, in the illustrated example the heat sealing element 864 is biased toward the heat sealing element 865 by a biasing assembly 2100. The biasing assembly 2100 can take a wide variety of different forms. The biasing arrangement may be any arrangement that biases the heat sealing elements 864, 865 relatively toward one another. In the illustrated example, the biasing assembly 2100 includes a support member 2101, a shaft member 2102, a spring 2104 disposed around the shaft member, and a coupling member 2106 connected to the heat sealing element 864. A head 2108 of the shaft member 2102 is disposed in a counterbore 2110 of the support member 2101 with a shaft portion 2112 of the shaft member extending through a hole 2114 in the support member 2101. The shaft member 2102 is free to move axially in the counterbore. An end of the shaft portion is connected to the coupling member 2106. The spring 2104 pushes the coupling member 2106 and attached heat sealing element 864 downward. The biasing assembly 2100 ensures that the heat sealing elements 864, 865 securely engage the web 10 between the belts 870 whenever the belts are engaged.

The heating element 864 can take a wide variety of different forms. Referring to FIG. 21, in the illustrated example the heating element 864 includes an outer body 1600, an internal ceramic element 1602, and an internal thermocouple 1604 or other device for measuring the temperature of the internal ceramic element 1602. A potting material or other encapsulating material surrounds the internal ceramic element 1602 and the thermocouple 1604. In an exemplary embodiment, the thermocouple 1604 is disposed directly on the ceramic element 1602.

A temperature control arrangement is coupled to the thermocouple 1602 and the ceramic element 1602 for controlling the temperature of the ceramic element 1602 based on feedback from the thermocouple 1604. The temperature measured by the thermocouple is used to adjust the power applied to the heating element and thereby control the temperature of the heating element. The temperature control arrangement is disposed in the housing 1204 of the machine. The temperature control arrangement may be part of an overall controller for the machine or the temperature control arrangement may be a separate device that interfaces with other devices.

The heating sealing element positioning device 866 can take a wide variety of different forms. Referring to FIGS. 13, 14, 21, and 22, in the illustrated example the heat sealing elements 864, 865 are coupled to the upper support members 2101 and a lower support member 2103. The heat sealing element 864 is coupled to the upper support member 2101 by the biasing assembly 2100 as described above. The lower heat sealing element 865 is fixed to the lower support member 2103. However, the lower heat sealing element may be coupled to the lower support member 2103 in any manner. For example, the lower heat sealing element 865 may be coupled to the lower support member 2103 by a second biasing assembly. In the illustrated embodiment, the heat sealing element positioning device 866 comprises two upper actuators 1300, 1302 and two lower actuators 1304, 1306. The two upper actuators 1300, 1302 are each operably connected to the upper support member 2101 and a fixed component of the machine 50, such as the housing 1204. The two lower actuators 1304, 1306 are each operably connected to the lower support member 2103 and a fixed component of the machine 50, such as the housing 1204. The actuators 1300, 1302, 1304, 1306 are operable to move the upper and lower support members 2101, 2103 and coupled heat sealing elements 864, 865 relatively toward and away from one another. As such, the heating elements 864, 865 are positioned with respect to the path of travel of the web 10 such that the sealing belts 870 selectively engage and disengage the web 10.

Figure 24:
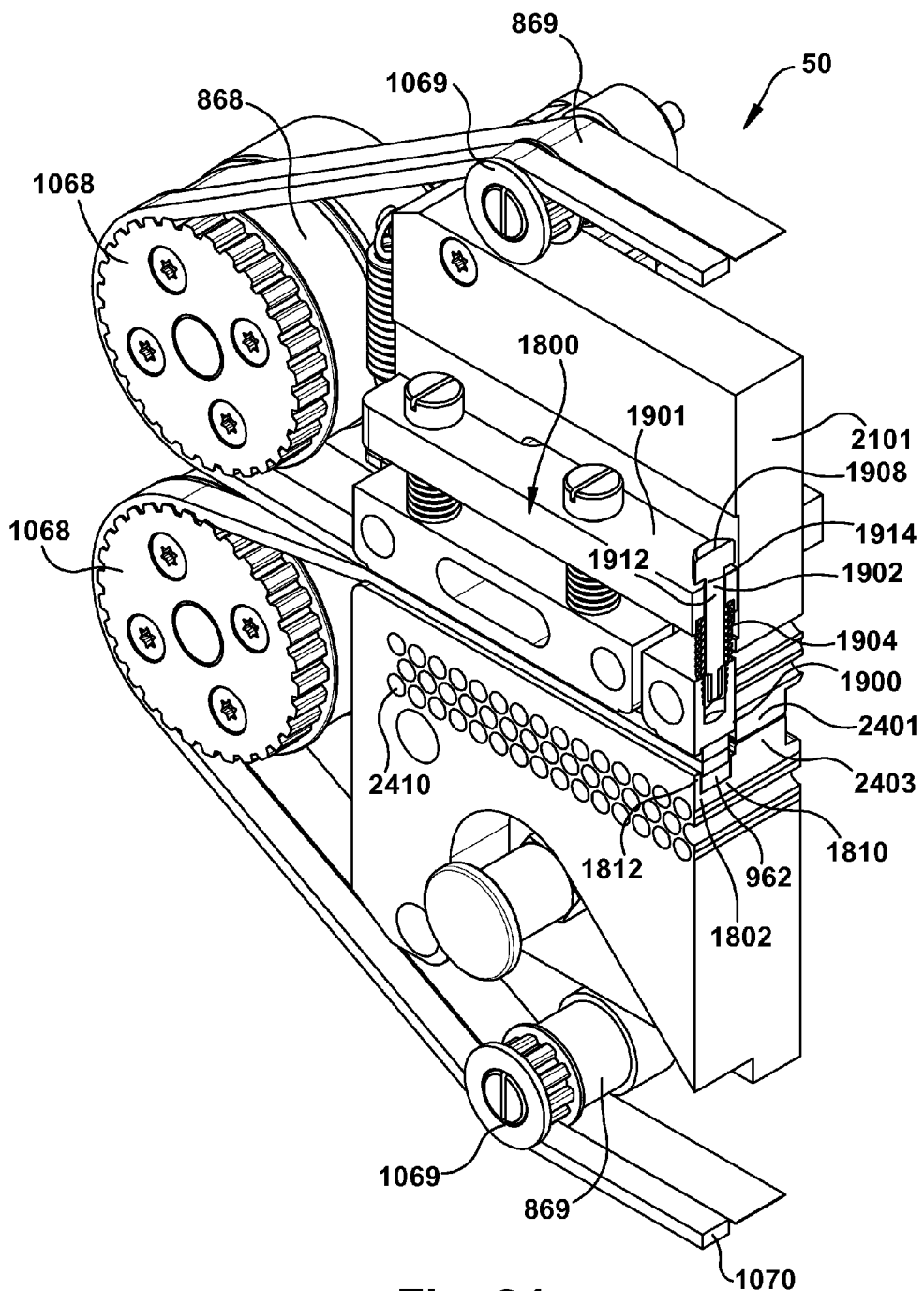
FIG. 24 is a sectioned perspective view with the section being taken as indicated by lines 24-24 in FIG. 23.
Figure 25:
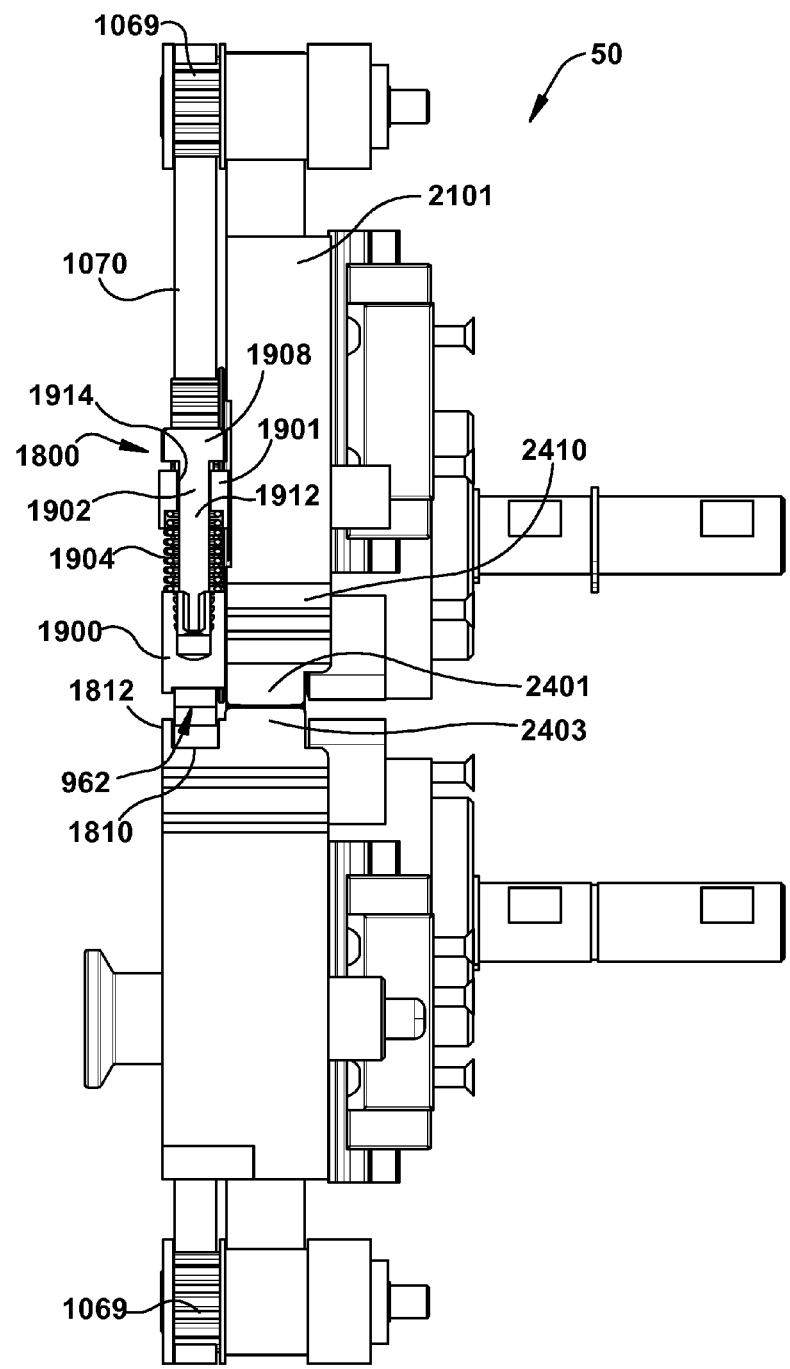
FIG. 25 is a sectional view taken along the plane indicated by lines 24-24 in FIG. 23.

Referring to FIGS. 24 and 25, the illustrated upper and lower support members 2101, 2103 include seal cooling portions 2401, 2403. The seal cooling portions 2401, 2403 engage the belts 870 and compress the material of the seal downstream of the sealing elements 864, 865. Heat of the seal is transferred through the belts 870 and into the seal cooling portions 2401, 2403 of the support members 2101, 2103 to cool the material of the seal. The illustrated upper and lower support members 2101, 2103 include optional holes 2410. The holes 2410 increase the surface area of the upper and lower support members 2101, 2103 to increase their effectiveness as heat sinks and reduce their weight. The upper and lower support members 2101, 2103 can be made from a wide variety of different materials. In an exemplary embodiment, the support members are made from a thermally conductive material such as aluminum or copper.

Figure 18:
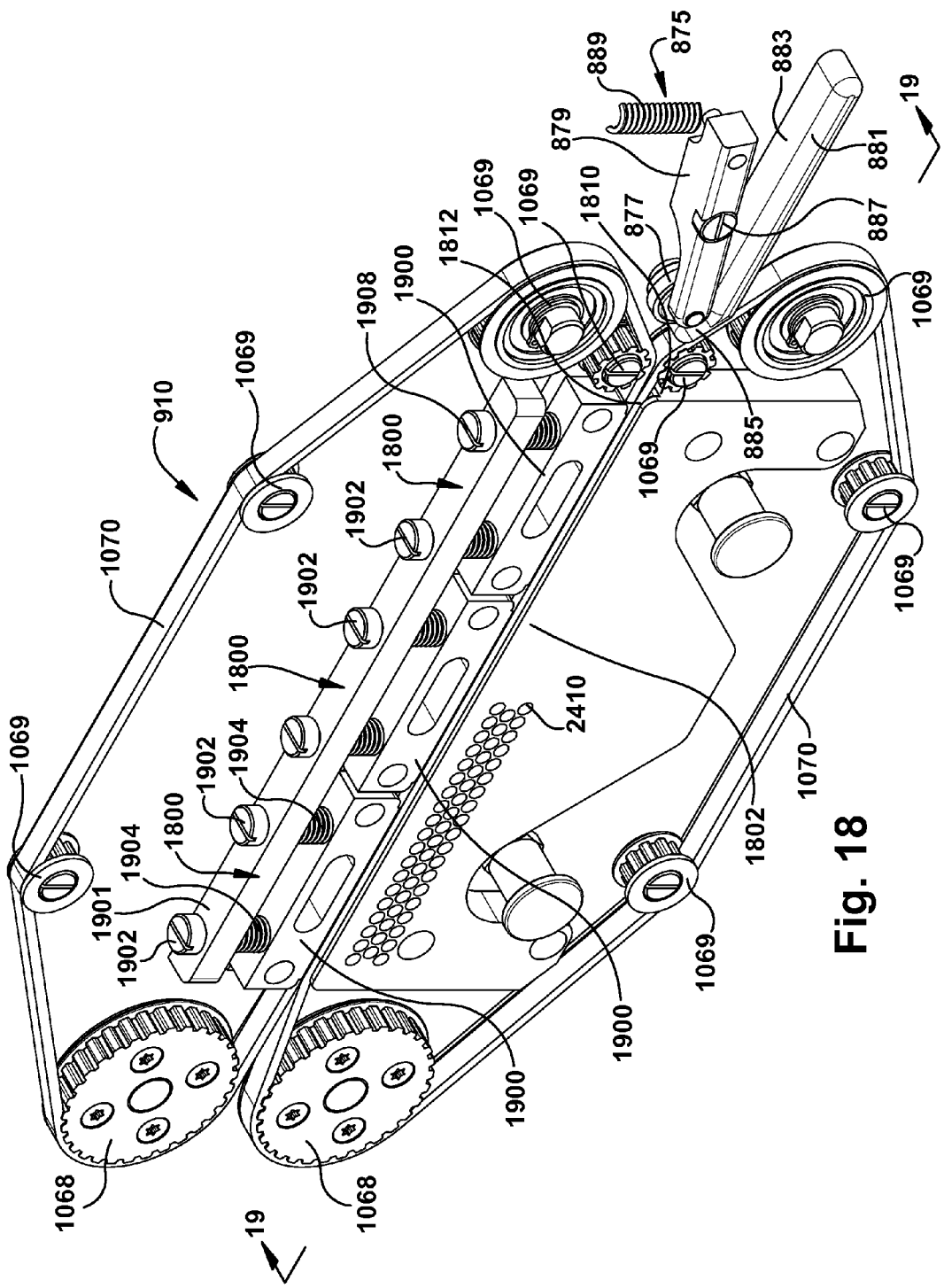
FIG. 18 is a perspective view of a clamping assembly of the air cushion inflation machine shown in FIG. 9.
Figure 19:
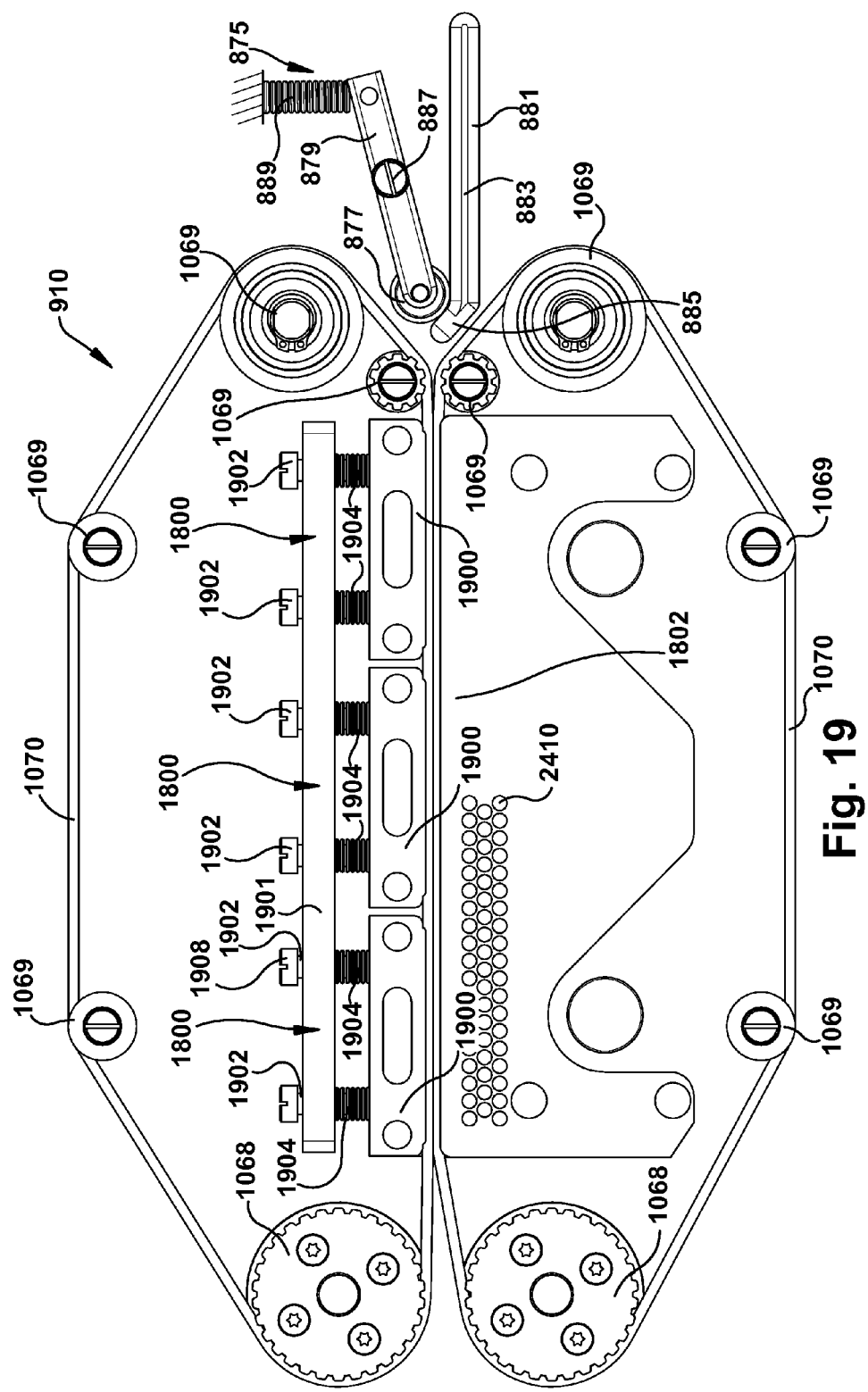
FIG. 19 is a view taken as indicated by lines 19-19 in FIG. 18.
Figure 20:
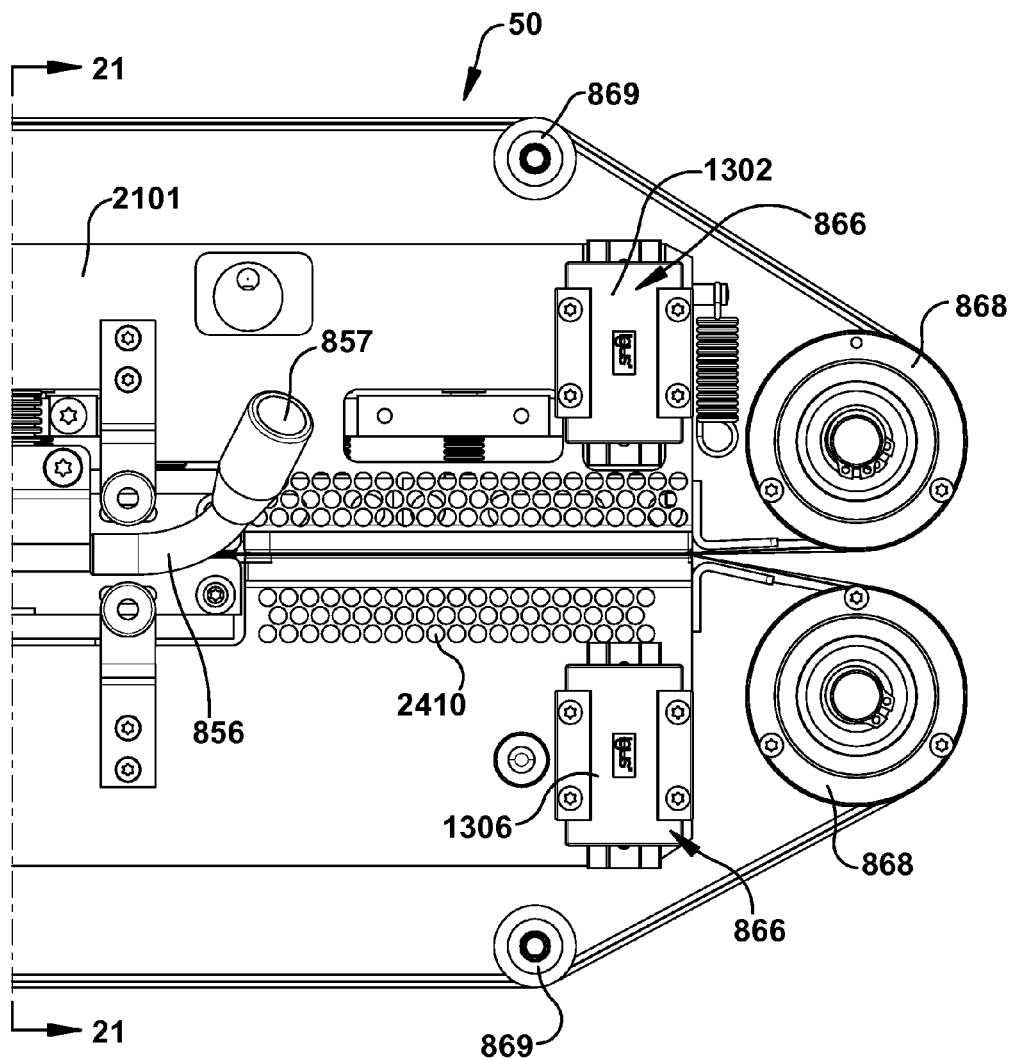
FIG. 20 is a partial rear view of the sealing and clamping assemblies shown in FIG. 11.

The clamping arrangement 910 is positioned to pinch the top and bottom layers 14, 16 of the preformed web together. The clamping arrangement 910 can take a wide variety of different forms. Referring to FIGS. 18 and 19, the clamping arrangement 910 includes drive rollers 1068, idler rollers 1069, spring loaded clamping assemblies 1800, a clamping portion 1802 of the lower support member 2103, and a pair of drive belts 1070. The illustrated clamping portion 1802 of the lower support member 2103 includes a support surface 1810 or groove and a lip 1812. The width of the support surface 1810 or groove corresponds to the width of the belts 1070. The support surface 1810 supports the lower belt 1070 and the lip 1812 retains the belt or the support surface.

Referring to FIGS. 24 and 25, each spring loaded clamping assembly 1800 includes a clamping member 1900, a shaft member 1902, and a spring 1904 disposed around the shaft member. The clamping members 1900, shaft members 1902, and springs are coupled to a support member 1901. Each clamping member 1900 is biased toward the clamping portion 1802 of the lower support portion 2103 by the springs 1902. A head 1908 of each shaft member 1902 is disposed on the support member 1901 with a shaft portion 1912 of the shaft member extending through a hole 1914 in the support member 1901. The shaft member 1902 is free to move axially in the counterbore. An end of each shaft portion 1912 is connected to a clamping member 1900. The springs 1904 push the clamping members 1900 downward. The biasing assemblies 1800 ensure that the belts 1070 securely engage the web 10 whenever the belts are engaged.

Each belt 1070 is disposed around its respective drive rollers 1068 and idler rollers 1069. Each belt 1070 is driven by its respective drive roller 1068, which is attached to a drive roller 868. As such, the sealing belts 870 and the pinching belts 1070 are driven in sync. The belts 1070 engage one another, such that the belts 1070 pull the web 10 and pinch the web as the web moves through the heat sealing elements 864, 865.

In the illustrated embodiment, the clamping arrangement 910 is positioned by the same positioning device 866 that positions the heat sealing elements 864. Since the clamping arrangement 910 moves with the upper and lower support members 2101, 2103, movement of the upper and lower support members 2101, 2103 by the positioning device 866 also moves the clamping arrangement 910. The positioning device 866 is coupled to the clamping arrangement 910 to selectively grip and release the web 10. This allows the web 10 to be manually loaded into the machine 50, allows the web to be manually removed from the machine, and/or allows any misfeeds of the web 10 to be cleared.

Figure 14:
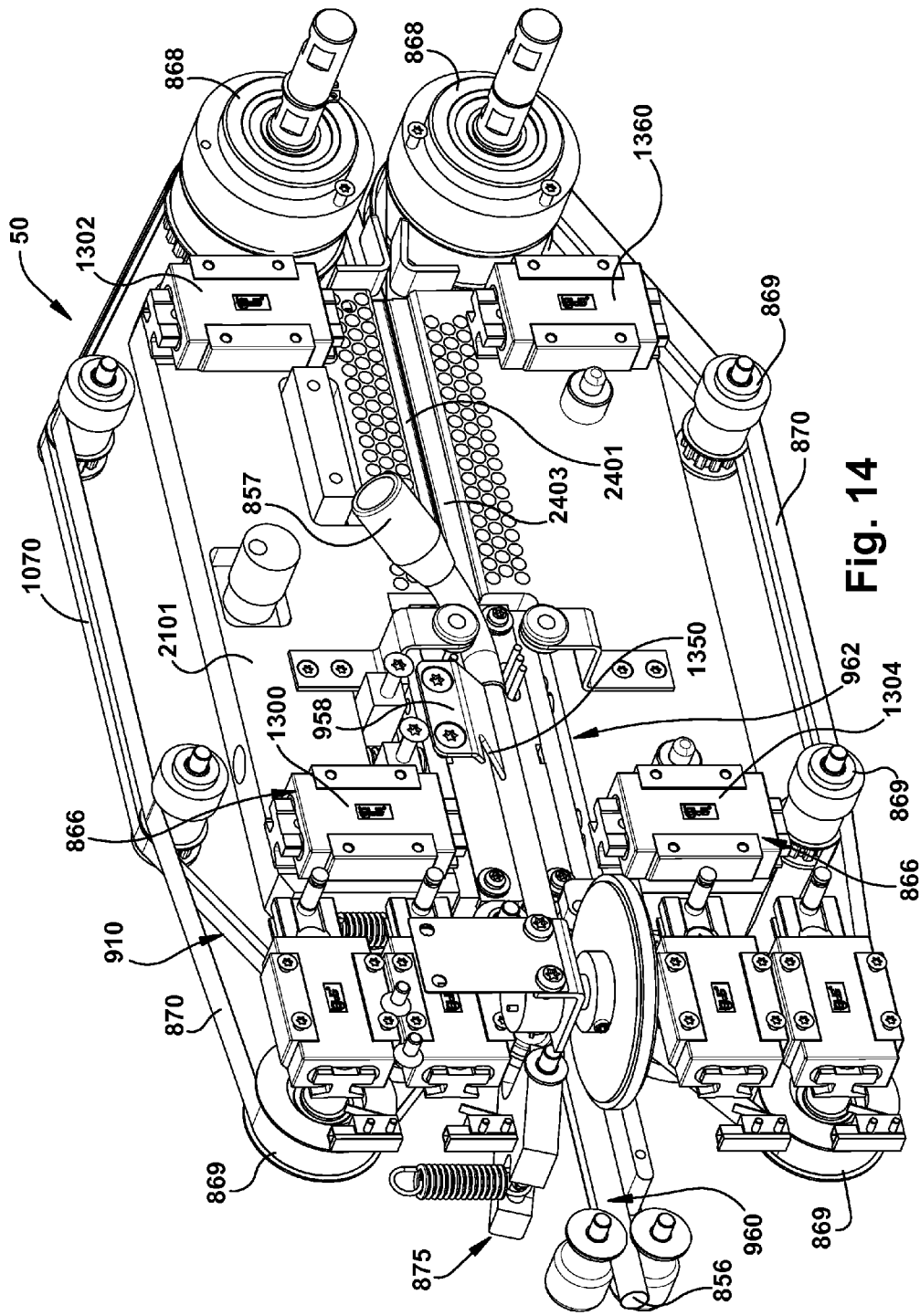
FIG. 14 is a rear perspective view of the sealing and clamp assemblies shown in FIG. 11.

Referring to FIGS. 13 and 14, the illustrated web separation device 958 is mounted to the guide pin 856. The web separation device 958 includes an edge 1350. The edge 1350 engages the web 10 to open the pocket and allow the web 10 to pass through the machine. The edge 1350 may be a blunt edge or a sharp edge, depending on the configuration of the web 10. For example, when the web 10 includes a line of perforations at or along the seal side edge 18, the edge 1350 may be a blunt surface, when the seal side edge 18 is not perforated the edge may be sharp. Referring to FIG. 13, in the illustrated embodiment the web separation device 958 is positioned along the path of travel at the heat sealing element 864. The web separation device 958 is positioned behind the heat sealing element so that the web separation device opens the pocket 23 of the web at the same time the pouches 26 are being sealed.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the invention to such detail. Additional advantages and modifications will readily appear to those skilled in the art. For example, the specific locations of the component connections and interplacements can be modified. Therefore, the invention, in its broader aspects, is not limited to the specific details, the representative apparatus, and illustrative examples shown and described. Accordingly, departures can be made from such details without departing from the spirit or scope of the applicant's general inventive concept.

What is claimed is:

1. A machine for converting a web of preformed pouches into inflated dunnage units, the pouches defined by transverse seals extending from a remote edge to within a predetermined distance from an inflation edge, the machine comprising:
   a guide pin for insertion between the transverse seals and the inflation edge to define a path of travel of the web;
   a tensioning device for frictional engagement with the web, wherein the tensioning device holds the web taught during downstream travel;
   an inflation arrangement for inflation of the preformed pouches;
   a sealing arrangement positioned to provide a longitudinal seal that intersects the transverse seals to close the preformed pouches and form a dunnage unit, the sealing arrangement having at least two sealing belts, each belt powered by a drive roller and positioned to engage a surface of the web and pull the web through sealing elements positioned on either side of the web; and
   a clamping arrangement positioned to pinch the two layers of the web during travel through the sealing elements, the clamping arrangement having a spring loaded clamping assembly and at least two pinching belts, each belt powered by a drive roller and positioned to engage a surface of the web between the longitudinal seal and the remote edge and pinch the web to inhibit air under pressure from applying force to the longitudinal seal, while the longitudinal seal is molten;
   wherein the spring loaded clamping assembly is attached to the machine and comprises a support member, at least one clamping member, at least one shaft member, and at least one spring disposed around the shaft member, wherein the clamping member, shaft member, and spring are coupled to the support member;
   wherein the at least two sealing belts and the at least two crimping belts are driven in sync.

2. The machine of claim 1 wherein the tensioning device holds the web taught during downstream travel and does not tear the web.

3. The machine of claim 1 wherein the tensioning device comprises:
   a shelf member with a horizontal portion and a downstream and upwardly angled portion that is angled upwardly toward the sealing arrangement; and
   a pivotable arm mounted to the machine, with one end of the arm attached to a spring and a roller rotatably attached to the other end of the arm;
   wherein the roller engages the web.

4. The machine of claim 3 wherein the roller forces the web against the horizontal portion of the shelf member.

5. The machine of claim 3 wherein the roller forces the web against the upwardly angled portion of the shelf member.

6. The machine of claim 3 wherein the roller engages the web at the intersection of the horizontal portion and the upwardly angled portion of the shelf member.

7. The machine of claim 6 wherein the roller forces the web against the horizontal portion of the shelf member and against the upwardly angled portion of the shelf member.

8. The machine of claim 1 wherein the tensioning device holds the web taught upon entering the sealing arrangement.

9. The machine of claim 3 wherein the upwardly angled portion of the shelf member extends upward at an obtuse angle relative the horizontal portion of the shelf member.

10. The machine of claim 3 wherein the web travels under the roller, up and over the upwardly angled portion of the shelf member, and immediately downstream to the sealing arrangement.

11. A machine for converting a web of preformed pouches into inflated dunnage units, the pouches defined by transverse seals extending from a remote edge to within a predetermined distance from an inflation edge, the machine comprising:
- a guide pin for insertion between the transverse seals and the inflation edge to define a path of travel of the web;
- an inflation arrangement for inflation of the preformed pouches;
- a tensioning device for frictional engagement with the web, the tensioning device having a shelf member with a horizontal portion and a downstream and upwardly angled portion that is angled upwardly toward the inflation arrangement, wherein an upper surface of the horizontal portion is positioned lower than a centerline of the guide pin, wherein an upper surface of the downstream and upwardly angled portion is positioned a distance D above the centerline, and wherein the tensioning device further has a pivotable arm mounted to the machine, with one end of the arm attached to a spring and a roller rotatably attached to the other end of the arm;
- a sealing arrangement positioned to provide a longitudinal seal that intersects the transverse seals to close the preformed pouches and form a dunnage unit, the sealing arrangement having at least two sealing belts, each belt powered by a drive roller and positioned to engage a surface of the web and pull the web through sealing elements positioned on either side of the web; and
- a clamping arrangement positioned to pinch the two layers of the web between the longitudinal seal and the remote edge during travel through the sealing elements to inhibit air under pressure from applying force to the longitudinal seal, while the longitudinal seal is molten;
- wherein the tensioning device holds the web taught during downstream travel by engagement of the web by the roller.

12. The machine of claim 11 wherein the clamping arrangement has at least two pinching belts, each belt powered by a drive roller and positioned to engage a surface of the web and pinch the web.

13. The machine of claim 12 wherein the at least two sealing belts and the at least two crimping belts are driven in sync.

14. The machine of claim 11 wherein the roller forces the web against the horizontal portion of the shelf member.

15. The machine of claim 11 wherein the roller forces the web against the upwardly angled portion of the shelf member.

16. The machine of claim 11 wherein the roller engages the web at the intersection of the horizontal portion and the upwardly angled portion of the shelf member.

17. The machine of claim 16 wherein the roller forces the web against the horizontal portion of the shelf member and against the upwardly angled portion of the shelf member.

18. The machine of claim 11 wherein the tensioning device holds the web taught upon entering the sealing arrangement.

19. The machine of claim 11 wherein the upwardly angled portion of the shelf member extends upward at an obtuse angle relative the horizontal portion of the shelf member.

20. The machine of claim 11 wherein the web travels under the roller, up and over the upwardly angled portion of the shelf member, and immediately downstream to the sealing arrangement.

21. The machine of claim 1 wherein a velocity of the at least two sealing belts is controlled based on a temperature of the sealing elements.

22. The machine of claim 1 wherein a temperature of the sealing elements is controlled based on a velocity of the at least two sealing belts.

23. The machine of claim 11 wherein a velocity of the at least two sealing belts is controlled based on a temperature of the sealing elements.

24. The machine of claim 11 wherein a temperature of the sealing elements is controlled based on a velocity of the at least two sealing belts.

25. A machine for converting a web of preformed pouches into inflated dunnage units, the pouches defined by transverse seals extending from a remote edge to within a predetermined distance from an inflation edge, the machine comprising:
- a guide pin for insertion between the transverse seals and the inflation edge to define a path of travel of the web;
- an inflation arrangement for inflation of the preformed pouches; and
- a sealing arrangement positioned to provide a longitudinal seal that intersects the transverse seals to close the preformed pouches and form a dunnage unit, the sealing arrangement having at least two sealing belts, each belt powered by a drive roller and positioned to engage a surface of the web and pull the web through sealing elements positioned on either side of the web;
- wherein a speed of the at least two sealing belts is controlled based on a temperature of the sealing elements, such that when the temperature of the sealing elements is lower than a predetermined setpoint, the speed of the at least two sealing belts is reduced and when the temperature of the sealing elements is higher than a predetermined setpoint, the speed of the at least two sealing belts is increased.

26. A machine for converting a web of preformed pouches into inflated dunnage units, the pouches defined by transverse seals extending from a remote edge to within a predetermined distance from an inflation edge, the machine comprising:
- a guide pin for insertion between the transverse seals and the inflation edge to define a path of travel of the web;
- an inflation arrangement for inflation of the preformed pouches; and
- a sealing arrangement positioned to provide a longitudinal seal that intersects the transverse seals to close the preformed pouches and form a dunnage unit, the sealing arrangement having at least two sealing belts, each belt powered by a drive roller and positioned to engage a surface of the web and pull the web through sealing elements positioned on either side of the web;
- wherein a temperature of the sealing elements is controlled based on a speed of the at least two sealing belts, such that when the speed of the at least two sealing belts is lower than a predetermined setpoint, the temperature of the sealing element is reduced and when the speed of the at least two sealing belts is higher than the predetermined setpoint, the temperature of the sealing element is increased.

27. A machine for converting a web of preformed pouches into inflated dunnage units, the pouches defined by transverse seals extending from a remote edge to within a predetermined distance from an inflation edge, the machine comprising:
- a guide pin for insertion between the transverse seals and the inflation edge to define a path of travel of the web;
- an inflation arrangement for inflation of the preformed pouches;
- a tensioning device for frictional engagement with the web, the tensioning device having a shelf member with a horizontal portion and a downstream and upwardly angled portion that is angled upwardly toward the inflation arrangement, and a pivotable arm mounted to the machine, with one end of the arm attached to a spring and a roller rotatably attached to the other end of the arm;
- a sealing arrangement positioned to provide a longitudinal seal that intersects the transverse seals to close the preformed pouches and form a dunnage unit, the sealing arrangement having at least two sealing belts, each belt powered by a drive roller and positioned to engage a surface of the web and pull the web through sealing elements positioned on either side of the web; and
- a clamping arrangement positioned to pinch the two layers of the web between the longitudinal seal and the remote edge during travel through the sealing elements to inhibit air under pressure from applying force to the longitudinal seal, while the longitudinal seal is molten;
- wherein the tensioning device holds the web taught during downstream travel by engagement of the web by the roller.

\* \* \* \* \*